(12) United States Patent
Varma et al.

(10) Patent No.: US 6,795,397 B2
(45) Date of Patent: Sep. 21, 2004

(54) METHOD FOR DETERMINING BURSTINESS OR A BURSTINESS CURVE OF A TRAFFIC SOURCE

(75) Inventors: Anujan Varma, Santa Cruz, CA (US); Christos Tryfonas, Foster City, CA (US)

(73) Assignee: The Regents of the University of California, Oakland, CA (US)

( * ) Notice: Subject to any disclaimer, the term of this patent is extended or adjusted under 35 U.S.C. 154(b) by 839 days.

(21) Appl. No.: 09/728,562

(22) Filed: Nov. 30, 2000

(65) Prior Publication Data

US 2002/0073224 A1 Jun. 13, 2002

Related U.S. Application Data

(60) Provisional application No. 60/168,482, filed on Dec. 1, 1999.

(51) Int. Cl.[7] .......................... G01R 31/08; G06F 11/00; G08C 15/00
(52) U.S. Cl. ...................... 370/230.1; 370/252; 710/52
(58) Field of Search ............................ 370/230, 230.1, 370/231, 232, 233, 234, 235, 235.1, 252, 253, 389, 412, 413, 414, 419; 710/52, 53, 54, 55, 56, 57

(56) References Cited

U.S. PATENT DOCUMENTS

| | | | | |
|---|---|---|---|---|
| 5,280,470 A | * | 1/1994 | Buhrke et al. | 370/232 |
| 5,381,407 A | * | 1/1995 | Chao | 370/233 |
| 5,566,175 A | * | 10/1996 | Davis | 370/468 |
| 6,304,551 B1 | * | 10/2001 | Ramamurthy et al. | 370/232 |

OTHER PUBLICATIONS

Chang, C.S., "Stability, Queue Length, and Delay of Deterministic and Stochastic Networks," IEEE Transactions on Automatic Control , 39(5): pp. 913–931, May., 1994.

Chong, S. and Li, S–Q, "Probabilistic Burstiness–Curve–Based Connection Control for Real–Time Multimedia Services in ATM Networks," IEEE Journal on Selected Areas in Communications, 15(6): pp. 1072–1086, Aug., 1997.

The ATM Forum Technical Committee. Traffic Management Specification Version 4.0 Technical Report, The ATM Form, Cover page + pp. ii–vii and 1–100, Apr., 1996,.

Cruz, R., "A Calculus for Network Delay, Part I: Network Elements in Isolation," IEEE Transactions on Information Theory, 37(1): pp. 114–131, Jan., 1991.

Garrett, M.W., "Contributions Toward Real–Time Services on Packet–Switched Networks," Ph.D. Thesis for Mark William Garrett, pp. 1–168, May., 1993.

(List continued on next page.)

Primary Examiner—Bob A. Phunkulh
(74) Attorney, Agent, or Firm—John P. O'Banion

(57) ABSTRACT

The resources required to support transmission of a traffic source, such as video or multimedia, over a packet-switched network are heavily dependent on the burstiness of the traffic source. The present invention provides methods for accurately and rapidly determining burstiness curves for traffic sources, such as elementary video and MPEG-2 transport streams. The described deterministic computation methods provide space and time efficiency in relation to the level of accuracy selected. The methods teach the exploitation of the piecewise linearity within the burstiness curves such that computations are only performed at points subject to slope change. The efficiency of the described methods suggest wide applicability to a range of traffic characterization situations, including QoS provisioning as well as real-time applications, such as TV distribution.

6 Claims, 23 Drawing Sheets

OTHER PUBLICATIONS

Goyal, P., Lam, S.S. and Vin, H.M., "Determining End–To–End Delay in Heterogeneous Networks," In Proceedings of the 5th International Workshop on Network and Operating System Support for Digital Audio and Video 9NOSS-DAV '95), Durham, New Hampshire, pp. 1–8, Apr., 1995.

Graf, M., "Traffic Shaping of VBR Video in ATM End Systems," In Proceedings of the 4th Open Workshop on High Speed Networks, pp. 1–6, Sep., 1994.

Guerin, r., Ahmadi, H., and Naghshineh, M., "Equivalent Caqpacity and its Application to Bandwidth Allocation in High–Speed Networks," pp. 968–981, Sep., 1991.

International Organization for Standardization, Information Technology–Generic Coding of Moving Pictures and Associated Audio: Systems, Recommendation H.222.0, ISO.IEC 13818–1, draft of International Standard Edition, Cover page + pp. ii–xix, pp. 1–136, Nov., 1994.

Knightly, E.W., Wrege, D.E., Liebeherr, J., and Zhang, H., "Fundamental Limits and Tradeoffs of Providing Deterministic Guarantees to VBR Video Traffic," In Proceedings of ACM Sigmetrics, pp. 98–107, 1995.

Low, S., Varaiya, P., "A Simple Theory of Traffic and Resource Allocation in ATM," In Proceedings of GLOBE-COM '91, vol. 3, pp. 1633–1637, Dec., 1991.

Roberts, J. and Hamdi, M., "Video Transport in ATM Networks," Journal on Interoperable Communication Networks, pp. 1–24, Jan., 1998.

Stiliadis, D. and Varma, A., "Latency–Rate Servers: A General Model for Analysis of Traffic Scheduling Algorithms," Technical Report UCSC–CRL–95–38, University of California at Santa Cruz, Department of Computer Engineering, Cover page + pp. 1–41, Jul., 1995.

Tryfonas, C., "MPEG–2 Transport Over ATM Networks," Master's Thesis, University of California at Santa Cruz, Cover page + pp. iii–xiii, pp. 1–116, Sep., 1996.

MPEG Traces, ftp://ftp–info3.informatik.uni–wuerzburg.de/pub/MPEG, Index pp. 1–3, + Index pp. 1, Mar., 1995.

* cited by examiner

/* = = = = = = = Compute Active Periods = = = = = = = = = =*/
/* = = = = = = = for Elementary Stream = = = = = = = = = =*/

/* Index $i$ denotes the $i$-th frame, $q_i$ denotes the queue size at the instant of $i$-th frame arrival and index $j$ denotes the $j$-th active period. */
1   /* Perform initialization */
   1.1    $s_1^r \leftarrow 1/f$; $q_1 \leftarrow d_1$; $i \leftarrow j \leftarrow 1$;
2
   2.1    If $([(q_i)/(r)] < 1/f)$   /* no backlog present at the start of next frame */
   2.1.2    $q_{i+1} \leftarrow d_{i+1}$;
   2.1.3    $t_j^r \leftarrow i/f + [(q_i)/(r)]$;   /* compute end time of current active period */
   2.1.4    $j \leftarrow j+1$;
   2.1.5    $s_j^r \leftarrow [(i+1)/(f)]$;   /* start time of new active period */
   2.2    else
   2.2.1    $q_{i+1} \leftarrow q_i + d_{i+1} - 1/f$;   /* there is backlog carried to current frame */
   2.3    endif
3
   3.1    $i \leftarrow I+1$;
   3.2    If $(i < N)$
   3.2.1    goto Step 2;
   3.3    endif
4
   4.1    $s(r) \leftarrow \max_{1 \leq k \leq N} q_k$;   /* compute maximum queue length observed */
   4.2    $t_j^r \leftarrow N/f + [(q_N)/(r)]$;   /* compute end time of last active period */
   4.3    $n_a(r) \leftarrow j$;   /* store the number of active periods */

FIG. 4

```
/* = = = = = = = Compute Burstiness Curve = = = = = = = = =*/
/* = = = = = = = = for Elementary Stream  = = = = = = = = = =*/
/* = = = = = = = =   by Exact Method      = = = = = = = = = =*/
```

1  /* Initialization */
1.1   $\rho \leftarrow 0$; $\alpha_{old} \leftarrow -1$; $\tau_{old} \leftarrow -1$;
2  /* Compute busy periods for current rate $\rho$, the busy period $j$ in which the global maximum queue size occurs, and the corresponding max queue size $Q^*$ */
2.1   compute_busy_periods($\rho$);
3  /* Compute rate for the next step */
3.1   $\rho' =$ compute_next_rate($\rho$);
4  /* Output corresponding point of the burstiness curve if necessary */
4.1   If ($\alpha_j \neq \alpha_{old}$) or ($\tau_j \neq \tau_{old}$)
4.1.1      Output ($\rho, Q^*$);
4.2   If ($\rho' = r$)
4.2.1      Output ($r, 0$);
4.2.2      STOP;
4.3   else
4.3.1      $\rho \leftarrow \rho'$; $\alpha_{old} \leftarrow \alpha_j$; $\tau_{old} \leftarrow \tau_j$;
4.3.2      goto Step 2;
4.4   endif

FIG. 5

/* = = = = = = = compute_busy_periods(ρ) = = = = = = = = = =*/
/* = = = = = = = = for Elementary Stream = = = = = = = = = = =*/
/* = = = = = = = = by Exact Method = = = = = = = = = = = = =*/ compute_busy_periods(ρ)

/* For a given sequence of active periods $(s_1, t_1),(s_2,t_2),...,(S_{n_a}, t_{n_a})$, and rate ρ, determines the busy periods $(\alpha_j, \beta_j)$, the local maximum queue size within each busy period $Q_j^*$ and the time at which the maximum occurs $\tau_j$. */

/* Perform initialization */

1. Define $S_{n_a+1} = \infty$;
2. $i \leftarrow 1$; /* index of active period */
3. $j \leftarrow 1$; /* index of busy period */
4. $Q' \leftarrow 0$; /* $Q'$ is used to compute the current queue size */
5. $\alpha_j \leftarrow s_i; Q_j^* \leftarrow 0$;
6. If (ρ = 0) /* Corner case when rate is zero */
6.1 Busy period $(\alpha_j, \beta_j)$ contains all active periods;
6.2 $Q_j^* \leftarrow$ stream size;
6.3 $\alpha_j \leftarrow s_1; \beta_j \leftarrow t_{n_a}; \tau_j \leftarrow l_{n_a}$;
7. endif

/* Compute queue size at the end of current active period */

8. $Q \leftarrow Q' + (t_i - s_i)r - \rho(t_i - s_i)$;
9. If $(Q_j^* < Q)$ /* update local maximum */
9.1 $Q_j^* \leftarrow Q; \tau_j \leftarrow t_i$;
10. endif

/* Check if current busy period ends before next active period begins */

11. $Q' \leftarrow Q - \rho(s_{i+1} - t_i)$;
12. If $(Q' < 0)$
    /* current busy period ended before next active period */
12.1 $\beta_j \leftarrow t_i + [(Q)/(\rho)]$; /* end of busy period */
12.2 $j \leftarrow j+1$; /* to next busy period */
12.3 $\alpha_j \leftarrow s_{i+1}; Q \leftarrow 0; Q_j^* \leftarrow 0$; /* init variables for next busy period */
13. endif
14. $i \leftarrow i+1$; /* to next active period */
15. If $(i \leq n_a)$ goto step 8;
16. endif
17. $Q^* \leftarrow \max_{1 \leq k \leq n_a} Q_k^*$; /* compute global maximum queue size */

FIG. 6

/* = = = = = = = compute_next_rate($\rho$) = = = = = = = = = = = =*/
/* = = = = = = = = for Elementary Stream = = = = = = = = = = =*/
/* = = = = = = = = by Exact Method = = = = = = = = = = = = =*/ compute_next_rate($\rho$)

/* Given current rate $\rho$, determine the next higher rate $\rho'$
at which the slope of the burstiness curve may change */

1.    $\rho' \leftarrow r$;
2.    For $j = 1$ to $n_b$    /* for each busy period */
2.1   Determine the lowest rate $\rho_{j,1}$ at which the busy period $j$ breaks;
2.2      If $(\rho_{j,1} < \rho')$
2.2.1        $\rho' \leftarrow \rho_{j,1}$;
2.3      endif
3.    endfor
/* Now determine the rates at which the global maximum moves */
4.    For $j = 1$ to $n_b$
4.1   Determine the lowest rate $\rho_{j,2}$ at which the position of the global maximum queue size changes;
4.2      If $(\rho_{j,2} < \rho')$
4.2.1        $\rho' \leftarrow \rho_{j,2}$;
4.3      endif
5.    endfor
6.    return($\rho'$);

FIG. 7

/* = = = = = = = = =  compute $\rho_{j1}$  = = = = = = = = = = =*/
/* = = = = = = = = = for Elementary Stream  = = = = = = = = = = =*/
/* = = = = = = = = = by Exact Method    = = = = = = = = = = = =*/

/* Given the busy period ($\alpha_j$, $\beta_j$) corresponding to rate $\rho$, determine
   the lowest rate at which the busy period breaks into multiple periods */

/* Let ( $s_k$, $t_k$), ($s_{k+1}$, $t_{k+1}$), ..., ($s_m$, $t_m$) be the active periods contained
   within the busy period ( $\alpha_j$, $\beta_j$) */

1.    If ($m = k$)   /* only one active period within busy period */
1.1      return($\infty$);
2.    endif
3.    $i \leftarrow k$; /* start with first active period */
4.    $W \leftarrow 0$; /* W denotes the accumulated arrivals within busy period */
5.    $\rho_{min} \leftarrow r$; /* initialize minimum */
   /* Determine the rate at which a break can occur between $t_i$ and $s_{i+1}$ */
6.    $W \leftarrow W + (t_i - s_i)r$; /* total arrivals up to $t_i$ */
7.    $\rho \leftarrow [(W)/((s_{i+1} - s_i))]$;
8.    If ($\rho < \rho_{min}$)
8.1      $\rho_{min} \leftarrow \rho$; /* update minimum */
9.    endif
10.   $i \leftarrow i+1$;
11.   If ($i < m$) goto step 6;
12.   return($\rho_{min}$);

FIG. 8

/* ========= compute $\rho_{j2}$ ============*/
/* ========= for Elementary Stream ==========*/
/* ========= by Exact Method ==============*/

/* Given the busy period $(\alpha_j, \beta_j)$ corresponding to rate $\rho$, determine the lowest rate at which the global maximum queue size moves to a different time instant within the current busy period. Let $(\alpha_l, \beta_l)$ be the busy period in which the current global maximum occurs, and $\tau_l$ the corresponding time. Let $\tau_j$ be the earliest instant at which the local maximum queue size occurs within the current busy period. Let $(s_k, t_k), (s_{k+1}, t_{k+1}), ..., (s_m, t_m)$ be the active periods contained within the interval $(\alpha_j, \tau_j)$. Let $(s_p, t_p), (s_{p+1}, t_{p+1}), ..., (s_q, t_q)$ be the active periods contained within the interval $(\alpha_l, \tau_l)$. */

/* compute total arrivals in busy period $l$ up to time $\tau_l$ */
1. $W_l \leftarrow \sum_{i=p}^{q} r(t_i - s_i)$;

2. $i \leftarrow k$; /* start with first active period */
3. $W \leftarrow 0$; /* $W$ denotes the arrivals during current busy period */
4. $\rho_{min} \leftarrow r$;
/* check if global maximum is in the first active period of current busy period */
5. If $(j = l)$ and $(q = p)$ /* maximum cannot move */
6.1    return$(r)$;
7. endif
/* Compute total arrivals at the end of current active period */
8. $W \leftarrow W + (t_i - s_i)r$;
/* Compute the rate at which queue size at $t_i$ becomes equal to that at time $\tau_l$ */
9. $\rho \leftarrow [(W_l - W)/((\tau_l - s_p) - (t_i - s_k))]$;
10. If $(\rho < \rho_{min})$
10.1    $\rho_{min} \leftarrow \rho$;
11. endif
12. $i \leftarrow i+1$;
13. If $(i \leq m)$ goto step 5;
14. return$(\rho_{min})$;

FIG. 9

/* ======== Compute Burstiness Curve ========*/
/* ========= for MPEG-2 Transport Stream =======*/
/* ========= by Exact Method ===========*/

1 /* Initialization */
1.1   $\rho \leftarrow r_{min}$; $\alpha_{old} \leftarrow -1$; $\tau_{old} \leftarrow -1$;
2 /* Compute busy periods for current rate $\rho$, the busy period $j$ in which the global maximum queue size occurs, and the corresponding max queue size $Q^*$ */
2.1   compute_busy_periods($\rho$);
3 /* Compute rate for the next step */
3.1   $\rho' = $ compute_next_rate($\rho$);
4 /* Output corresponding point of the burstiness curve if necessary */
4.1   If $(\alpha_j \neq \alpha_{old})$ or $(\tau_j \neq \tau_{old})$
4.1.1     Output $(\rho, Q^*)$;
4.2   If $(\rho' = r_{max})$
4.2.1     Output $(r_{max}, 0)$;
4.2.2     STOP;
4.3   else
4.3.1     $\rho \leftarrow \rho'$; $\alpha_{old} \leftarrow \alpha_j$; $\tau_{old} \leftarrow \tau_j$;
4.3.2     goto Step 2;
4.4   endif

FIG. 12

/* = = = = = = = = compute_busy_periods(ρ) = = = = = = = = = = = = = =*/
/* = = = = = = = = = for MPEG-2 Transport Stream = = = = = = = = =*/
/* = = = = = = = = = by Exact Method = = = = = = = = = = = = = = =*/ compute_busy_periods(ρ)

/* For a given sequence of rate segments $(s_1, t_1),(s_2,t_2),...,(S_{n_r}, t_{n_r})$, and rate ρ, determine the busy periods ($\alpha_j, \beta_j$), the local maximum queue size within each busy period $Q_j^*$, the time at which the maximum occurs $\tau_j$, and the global maximum queue size $Q^*$. */

/* Perform initialization */
1. Define $S_{n_r+1} = \infty$;

2. $i \leftarrow 1$; /* index of rate segment */
3. $j \leftarrow 1$; /* index of busy period */
4. $Q \leftarrow 0$; /* $Q$ denotes the current queue size */
5. $\alpha_j \leftarrow s_i$; $Q_j^* \leftarrow 0$;
 /* Compute queue size at the end of current rate segment */
6. $Q \leftarrow Q + (t_i - s_i)r_i - \rho(t_i - s_i)$;
7. If $(Q_j^* < Q)$ /* update local maximum */
7.1     $Q_j^* \leftarrow Q$; $\tau_j \leftarrow t_i$;
8. endif
 /* Check if current busy period ends before
    next rate segment begins */
9. If $(Q < 0)$
 /* current busy period ended before next rate segment */
9.1     $\beta_j \leftarrow t_i + [(Q)/(\rho - r_i)]$; /* end of busy period */
9.2     $j \leftarrow j+1$; /* to next busy period */
 /* Skip all rate segments $i$ which have $r_i < \rho$; */
9.3     while $(r_i < \rho)$, $i \leftarrow i+1$;
9.4     $\alpha_j \leftarrow s_{i+1}$; $Q \leftarrow 0$; $Q_j^* \leftarrow 0$; /* init variables for next busy period */
10. endif
11.  $i \leftarrow i+1$; /* to next rate segment */
12. If $(i \leq n_r)$ goto step 6;
13. endif
14. $Q^* \leftarrow \max_{1 \leq k \leq n_r} Q_k^*$; /* compute global maximum queue size */

FIG. 13

```
/* ======== compute_next_rate(ρ)   ===============*/
/* ========   for MPEG-2 Transport Stream  =========*/
/* ========   by Exact Method    ================*/
``` compute_next_rate(ρ)

/* Given current rate ρ, determines the next higher rate ρ'
at which the slope of the burstiness curve may change */

1. $\rho' \leftarrow r_{max}$;
2. For $j = 1$ to $n_b$  /* for each busy period */
2.1 /* Determine the lowest rate $\rho_{j,1}$ at which the busy period $j$ breaks */;
2.2   If ($\rho_{j,1} < \rho'$)
2.2.1     $\rho' \leftarrow \rho_{j,1}$;
2.3   endif
3. endfor
/* Now determine the rates at which the global maximum moves */
4. For $j = 1$ to $n_b$
4.1 /* Determine the lowest rate $\rho_{j,2}$ at which either the position of the global maximum queue size changes, or the starting time of busy period $j$ moves to a later time instant */;
4.2   If ($\rho_{j,2} < \rho'$)
4.2.1     $\rho' \leftarrow \rho_{j,2}$;
4.3   endif
5. endfor
6.   return(ρ');

FIG. 14

/* ======== Compute $\rho_{j1}$ ================ */
/* ======== for MPEG-2 Transport Stream ========= */
/* ======== by Exact Method ================ */

/* Given the busy period ($\alpha_j$, $\beta_j$) corresponding to rate $\rho$, determine
   the lowest rate at which the busy period breaks into multiple periods */

/* Let ( $s_k$, $t_k$), ($s_{k+1}$, $t_{k+1}$), ..., ($s_m$, $t_m$) be the rate segments contained
   within the busy period ($\alpha_j$, $\beta_j$) */

1.  If ($m = k$)  /* only one rate segment within busy period */
1.1     return($\infty$);
2.  endif
3.  $i \leftarrow k$;  /* start with first rate segment */
4.  $W \leftarrow 0$;  /* $W$ denotes the accumulated arrivals within busy period */
5.  $\rho_{min} \leftarrow r_{max}$;  /* initialize minimum */
  /* Determine the rate at which a break can occur between $t_i$ and $s_{i+1}$ */
6.  $W \leftarrow W+(t_i-s_i)r_i$;  /* total arrivals up to $t_i$ */
7.  $\rho \leftarrow [(W)/( (s_{i+1}-s_i))]$;
8.  If ($\rho < \rho_{min}$)
8.1     $\rho_{min} \leftarrow \rho$;  /* update minimum */
9.  endif
10. $i \leftarrow i+1$;
11. If ($i < m$) goto step 6;
12. return($\rho_{min}$);

FIG. 15

/\* = = = = = = = =  Compute $\rho_{j2}$  = = = = = = = = = = = = = = = = = =\*/
/\* = = = = = = = =  for MPEG-2 Transport Stream  = = = = = = = = =\*/
/\* = = = = = = = =  by Exact Method  = = = = = = = = = = = = =\*/

/\* Given the busy period $(\alpha_j, \beta_j)$ corresponding to rate $\rho$, determine the lowest rate at which the global maximum queue size moves to a different time instant within the current busy period. Let $(\alpha_l, \beta_l)$ be the busy period in which the current global maximum occurs, and $\tau_l$ the corresponding time. Let $\tau_j$ be the earliest instant at which the local maximum queue size occurs within the current busy period. Let $(s_k, t_k), (s_{k+1}, t_{k+1}), ..., (s_m, t_m)$ be the rate segments contained within the interval $(\alpha_j, \tau_j)$. Let $(s_p, t_p), (s_{p+1}, t_{p+1}), ..., (s_q, t_q)$ be the rate segments contained within the interval $(\alpha_l, \tau_l)$. \*/

/\* compute total arrivals in busy period $l$ up to time $\tau_l$ \*/
1.   $W_l \leftarrow \sum_{i=p}^{q} r_i(t_i - s_i)$;

2.   $i \leftarrow k$;  /\* start with first rate segment \*/
3.   $W \leftarrow 0$;  /\* $W$ denotes the arrivals during current busy period \*/
4.   $\rho_{min} \leftarrow r_k$;
/\* check if global maximum is in the first rate segment of current busy period \*/
5.   If $(j = l)$ and $(q = p)$  /\* maximum cannot move \*/
6.1     return($r_{max}$);
7.   endif
/\* Compute total arrivals at the end of current rate segment \*/
8.   $W \leftarrow W + (t_i - s_i)r_i$;
/\* Compute the rate at which queue size at $t_i$ becomes equal to that at time $\tau_l$ \*/
9.   $\rho \leftarrow [(W_l - W)/((\tau_l - s_p) - (t_i - s_k))]$;
10.  If $(\rho < \rho_{min})$
10.1    $\rho_{min} \leftarrow \rho$;
11.  endif
12.  $i \leftarrow i + 1$;
13.  If $(i \leq m)$ goto step 5;
14.  return($\rho_{min}$);

FIG. 16

/* = = = = = = = = compute_next_rate(ρ)    = = = = = = = = = = = = */
/* = = = = = = = = for Elementary Video Stream = = = = = = = = = = */
 /* = = = = = = = by Approximate Method     = = = = = = = = = = */ compute_next_rate(ρ)

/* Given current rate ρ and maximum busy period $l$, determines the next higher rate ρ′ at which the slope of the burstiness curve may change */

1.    ρ′ ← r;
2.    /* Determine the lowest rate $ρ_{l,1}$ at which the busy period $l$ breaks */;
3.    If ($ρ_{l,1}$ < ρ′)
3.1      ρ′ ← $ρ_{l,1}$;
4.    endif
/* Now determine the rates at which the global maximum moves */
5.    /* Determine the lowest rate $ρ_{l,2}$ at which the position of the global maximum queue size changes */;
6.    If ($ρ_{l,2}$ < ρ′)
6.1      ρ′ ← $ρ_{l,2}$;
7.    endif
8.    return(ρ′);

FIG. 17

```
/* ======== compute_next_rate(ρ)   =============*/
/* ======== for MPEG-2 Transport Stream  ==========*/
/* ======== by Approximate Method       ==========*/
``` compute_next_rate(ρ)

/* Given current rate ρ and maximum busy period $l$, determine the next higher rate ρ′ at which the slope of the burstiness curve may change */

1.    ρ′ ← $r_{max}$;
2.    /* Determine the lowest rate $ρ_{l,1}$ at which the busy period $l$ breaks */;
3.    If ($ρ_{l,1}$ < ρ′)
3.1    ρ′ ← $ρ_{l,1}$;
4.    endif
   /* Now determine the rates at which the global maximum moves */
5.    /* Determine the lowest rate $ρ_{l,2}$ at which either the position of the global maximum queue size changes, or the starting time of busy period $l$ moves to a later time instant */;
6.    If ($ρ_{l,2}$ < ρ′)
6.1    ρ′ ← $ρ_{l,2}$;
7.    endif
8.    return(ρ′);

FIG. 18

METHOD FOR DETERMINING BURSTINESS OR A BURSTINESS CURVE OF A TRAFFIC SOURCE

CROSS-REFERENCE TO RELATED APPLICATIONS

This application claims priority from U.S. provisional application Ser. No. 60/168,482 filed on Dec. 1, 1999, incorporated herein by reference.

STATEMENT REGARDING FEDERALLY SPONSORED RESEARCH OR DEVELOPMENT

This invention was made with Government support under Grant No. MIP-9257103, awarded by the National Science Foundation, and under Contract No. F19628-96-C-0038 awarded by DARPA. The Government has certain rights in this invention.

REFERENCE TO A MICROFICHE APPENDIX

Not Applicable

BACKGROUND OF THE INVENTION

1. Field of the Invention

This invention pertains generally to the analysis of the variability of multimedia traffic sources and the provisioning of the Quality-of-Service parameters and more particularly to a method of determining burstiness, and burstiness curves, for a multimedia source.

2. Description of the Background Art

The explosive growth of the Internet has spawned demand for new applications whose traffic has been traditionally carried over switched networks. These new applications include audio telephony, video conferencing and video-on-demand (VoD) services. New standards are emerging to support these applications in the context of both connectionless and connection-oriented packet-switched networks.

The rate variability of traffic sources, especially video, have introduced the need for characterizing the traffic so that the appropriate resources may be allocated by the network when handling the traffic, for instance, during the call admission control (CAC) process. Numerous resources may require allocation, including bandwidth, and buffer space. Traffic characterization may also be applied to facilitate policing of the traffic on the packet-switched network.

Characterization of video sources has become increasingly important as a result of transporting video over packet-switched networks. One method that provides characterization of a traffic source is through employing a time-invariant traffic constraint function in which bounds are determined for the maximum number of bits that may be generated by the source over any arbitrary interval of time. The least upper bound of the time constraint function is also referred to as the minimum envelope process or empirical envelope. Accurate traffic characterization can be performed for a source by the minimum envelope process, however, such a process requires the use of a large number of "leaky buckets" to effectively police the traffic, and the practical significance of the process is thereby compromised. Since current packet-switched networks employ simple leaky-bucket mechanisms for traffic policing, the use of the minimum envelope process does not facilitate traffic policing.

Another method of characterizing a traffic source is by means of its burstiness curve. The points $(\sigma,\rho)$ along the burstiness curve correspond to maximum queue size $\sigma$ that is necessary when said traffic source is fed into a server having a deterministic service rate $\rho$. Consequently, if the traffic source is sent to a leaky bucket with parameters $(\sigma,\rho)$, none of its packets will be tagged as non-conformant. The burstiness curve, therefore, provides an attractive metric for use in policing current packet-switched networks and for allocating resources.

Burstiness curves are typically characterized by means of a token-bucket mechanism. The input of the token-bucket is the traffic generated by the source whereas the output is the corresponding token-bucket constrained traffic. The output of the token bucket is sometimes referred to as a $(\sigma,\rho,r)$ conformant traffic stream, where $\sigma$ is the number of tokens in the token bucket, $\rho$ the rate of the incoming tokens, and $r$ the peak rate of the server. If $A(t_1, t_2)$ is the amount of traffic that leaves the token bucket during an interval $(t_1, t_2)$, then the following constraint holds:

$$A(t_1, t_2) \leq \min\{r(t_1-t_2), \sigma+\rho(t_2-t_1)\} \qquad (1)$$

A traffic source is said to be $(\sigma,\rho,r)$ conformant if its traffic can go through a token-bucket shaper with bucket size $\sigma$ and rate $\rho$, at peak rate $r$ with the queue size never exceeding $\sigma$. In the context of ATM networks, $(\sigma,\rho,r)$ enforcement is provided by utilizing the Generalized Cell-Rate Algorithm (GCRA).

Specifying an appropriate $(\sigma,\rho,r)$ tuple for the traffic source is critical to the proper allocation of resources, for instance bandwidth and buffer space, in providing a desired level of service to the traffic stream. However, there is no single tuple that uniquely characterizes a source. For any given peak rate $r$, it is evident from Eq. (1) that, for any value of $\rho$, there is a corresponding value of $\sigma$ such that the source is conformant. Hence, the set of conformant $(\sigma,\rho)$ pairs describe a curve which is referred to as the burstiness curve. Complete characterization of a source can be provided by plotting a set of burstiness curves for different values of the peak rate $r$. The burstiness curve of a video source is useful in determining the level of resources necessary to achieve any desired QoS level. It will be appreciated that both the delay and packet-loss rate in the network are functions of $\sigma$ and $\rho$. Knowledge of the burstiness curve of the source, therefore, enables the admission control process to allocate the minimum level of resources to achieve a desired QoS level.

In addition, the delay calculation in the network depends on the burstiness curve of the source. A properly configured packet-switched network scheduler based on burstiness curves allows for the specification of a maximum end-to-end guaranteed delay time. The specification of end-to-end delay of a traffic source requires utilizing algorithms configured for adherence to a strict upper bound on the delay of a session. It will be appreciated, however, that in order for a scheduling discipline to guarantee a worst-case delay bound to a session, the burstiness of the source traffic must be bounded. Analysis of worst-case delay is typically considered in relation to a token-bucket constrained traffic model. Different frameworks have been developed to formalize the characterization of schedulers and obtain the worst-case boundaries of delay. One such framework is that of "Latency-rate" (LR) which provides a general model for computation of the worst-case delay bound of several schedulers. Schedulers that fall into this classification are often referred to as Latency-Rate (LR) servers.

In utilizing the LR model it is assumed that the bandwidth allocated by the network to the session is equal to the average rate of the source $\rho$. According to the LR model, the worst-case delay bound $d_M$ of a tandem network consisting of K schedulers belonging to the LR class is given by:

$$d_M = \frac{\sigma}{\rho} + \sum_{i=1}^{K} \Theta_i \qquad (2)$$

where $\sigma$, $\rho$ are the parameters of the source, and $\Theta_i$ is a parameter of the scheduler, called latency. Solving for $\sigma$, the following constraint for $\sigma$ and $\rho$ is obtained which satisfies a specified worst-case delay bound:

$$\sigma = \left( d_M - \sum_{i=1}^{K} \Theta_i \right) \rho \qquad (3)$$

Upon considering the result it will be recognized that the optimum $(\sigma,\rho)$ pair is obtained at the intersection between the line defined by Eq. (3) and the burstiness curve.

Determination of the burstiness curve typically relies on simulation based techniques, with results obtained subsequent to a lengthy simulation session. Simulation techniques are considered especially onerous when fine rate granularity is required. Conventional methods are unable to readily determine burstiness, and burstiness curves to any desired level of granularity.

Therefore, a needs exists for an improved method of determining burstiness and burstiness curves wherein both exact determinations and approximations can be performed in less time while preferably utilizing fewer processing resources. The present invention satisfies those needs, as well and others, and overcomes the deficiencies of prior solutions.

BRIEF SUMMARY OF THE INVENTION

The present invention provides methods for determining burstiness and burstiness curves for traffic streams, typified by multimedia streams such as video and audio. By way of example and not of limitation, the detailed embodiments describe burstiness computation methods tailored for use with both elementary video streams and MPEG-2 transport streams. These burstiness computation methods exploit the piecewise linearity that exists within the burstiness curves of traffic streams. The methods are capable of ascertaining the minimum number of requisite points in order to compute exact results. Therefore, the methods of the present invention are optimal with regard to the number of points necessary for computing an exact result for a burstiness curve. In addition, an approximate version of the method is described which reduces the computational effort by considering a smaller number of candidate points of known significance. The methods exhibit efficiency with regard to both time and space in comparison with traditional simulation-based approaches. It is anticipated that the high efficiency of the proposed methods proffer their use within a number of application areas, which include but are not limited to, video servers which compute burstiness curves of video traces for storage as metadata with the trace for QoS control, and real-time video distribution systems that need to estimate the burstiness curve of their video programs in real-time.

The method of the invention determines the computation and selection process for the traffic parameters of a multimedia traffic source. The traffic parameters are considered crucial for the correct provisioning and dimensioning of network resources in the case of transmission over a packet network. The method simulates a token-bucket traffic policing mechanism to analyze the traffic source which leads to an exact burstiness curve computation. The burstiness curve determination methods can be applied to any multimedia traffic source, and therefore, to both elementary video streams and MPEG-2 Transport Streams. The method exploits the piecewise linearity of the burstiness curve and restricts computation to those points at which the slope of the burstiness curve changes. In addition, an approximate version of the burstiness curve determination method is presented which saves computational effort by considering only those candidate points along the curve at which the slope of the burstiness curve may change. The approximate method is capable of providing results, suitable for numerous applications, in substantially less time. For example, in computing burstiness for a two-hour long elementary video stream, the approximate method according to the present invention determined the curve in approximately ten seconds with virtually no loss of accuracy in relation to the exact method which required a period of over six hours to perform the computations. The efficiency of the proposed methods are well suited for a range of applications including QoS provisioning in both off-line environments, such as in Video-on-Demand (VoD) servers, and in real-time applications, such as live TV distribution systems.

An object of the invention is to provide an efficient method of determining exact burstiness curves for multimedia streams.

Another object of the invention is to provide a method of exactly determining burstiness that is operable with both elementary video streams and MPEG-2 transport streams.

Another object of the invention is to provide a method which exploits the piecewise linearity of the burstiness curves so as to reduce necessary computation resources.

Another object of the invention is to provide a method of exactly determining burstiness in which the minimum number of subject points need be identified during computation.

Another object of the invention is to provide a method of determining burstiness and burstiness curves that can be performed in less time for a given accuracy level.

Another object of the invention is to provide a computationally space-efficient method of determining burstiness.

Another object of the invention is to provide a method of determining burstiness which is compatible with video servers.

Another object of the invention is to provide a method of determining burstiness which is compatible with real-time video distribution systems.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4 is pseudocode of an exemplified method for computing an exact burstiness curve of an elementary video stream according to an aspect of the present invention.

FIG. 5 is pseudocode of an exemplified method for computing active periods within an elementary video stream according to an aspect of the present invention.

FIG. 6 is pseudocode of an exemplified method for computing busy period within an elementary video stream according to an aspect of the present invention.

FIG. 7 is pseudocode of an exemplified method for computing the rate of the next iteration of the burstiness method for an elementary video stream according to an aspect of the present invention.

FIG. 8 is pseudocode of an exemplified method for computing the lowest rate at which the busy period breaks into multiple periods within an elementary video stream according to an aspect of the present invention.

FIG. 9 is pseudocode of an exemplified method for computing the lowest rate at which the global queue size moves to a different time instant within the current busy period of an elementary video stream according to an aspect of the present invention.

FIG. 12 is pseudocode of an exemplified method for computing the exact burstiness curve for an MPEG-2 transport stream according to an aspect of the present invention.

FIG. 13 is pseudocode of an exemplified method for computing busy period within an MPEG-2 transport stream according to an aspect of the present invention.

FIG. 14 is pseudocode of an exemplified method for computing the rate of the next iteration of the burstiness method for an MPEG-2 transport stream according to an aspect of the present invention.

FIG. 15 is pseudocode of an exemplified method for computing the lowest rate at which the busy period breaks into multiple periods within an MPEG-2 transport stream according to an aspect of the present invention.

FIG. 16 is pseudocode of an exemplified method for computing the lowest rate at which the global queue size moves to a different time instant within the current busy period of an MPEG-2 transport stream according to an aspect of the present invention.

FIG. 17 is pseudocode of an exemplified method for approximating the burstiness curve of an elementary video stream according to an aspect of the present invention.

FIG. 18 is pseudocode of an exemplified method for approximating the burstiness curve of an MPEG-2 transport stream according to an aspect of the present invention.

DETAILED DESCRIPTION OF THE INVENTION

Referring more specifically to the drawings, for illustrative purposes the present invention is embodied in the apparatus generally shown in FIG. 1 through FIG. 25. It will be appreciated that the apparatus may vary as to configuration and as to details of the parts, and that the method may vary as to the specific steps and sequence, without departing from the basic concepts as disclosed herein.

Streams of video, and other forms of possibly bursty media, may be transported over packet-switched networks by a variety of encoded transport mechanisms. The present invention provides methods of computing burstiness and burstiness curves which are applicable for use within any apparatus containing a computer, including both dedicated computers and embedded systems. Although the method may be utilized for any form of digital media stream, it is embodied by way of example and not of limitation in relation to the common video formats comprising elementary video streams and MPEG-2 transport streams. The method is further embodied in both an exact method and an approximate method, wherein speed and accuracy of the method may be matched to the requirements of the particular application.

Figure 1:
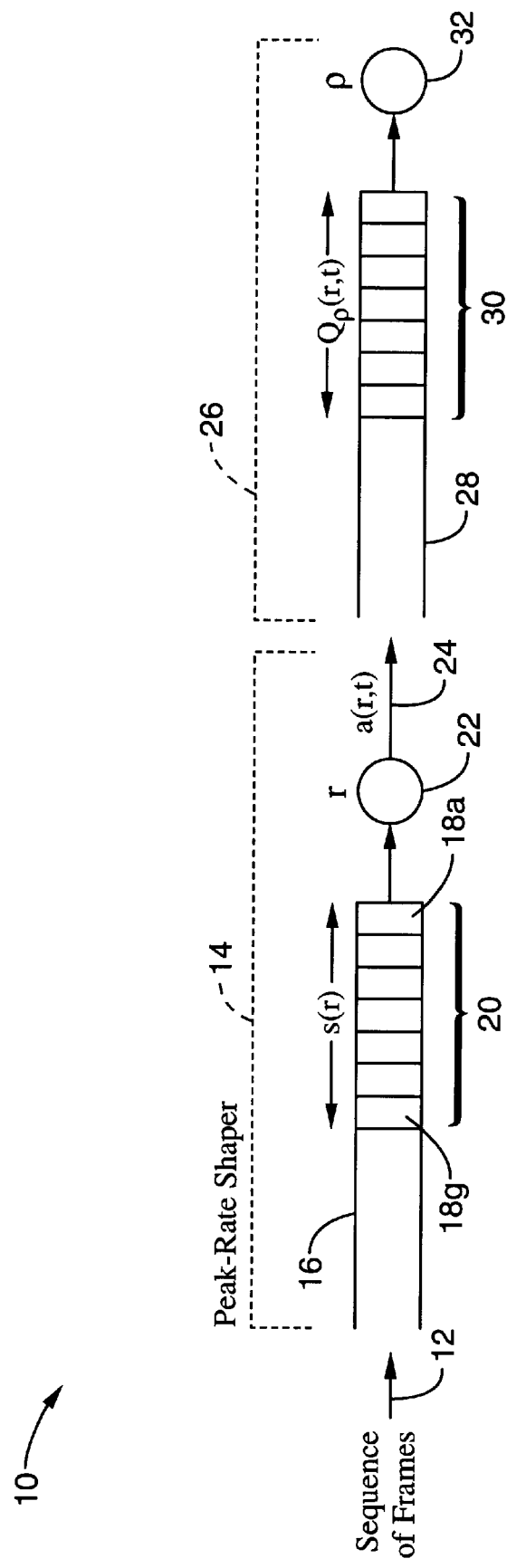
FIG. 1 is a schematic for a model utilized for determining the burstiness of a multimedia stream according to the present invention.

FIG. 1 depicts a model 10 utilized for computing the burstiness curve for an elementary video stream according to the present invention. A common transport mechanism is that of an elementary video stream consisting of a sequence of variable length frames that are generated at a fixed rate (frame period). The traffic source 12 goes through a peak-rate shaper 14 comprising an input queue mechanism 16 within which a new time sequence for the bit-stream of the input traffic source is created. A small sequence of frames 18a–18g is presently represented within the queue 16. In response to different values of the peak rate r, the maximum queue depth 20, denoted by s(r), within input queue 16 of peak-rate shaper 14 will vary. Frames are removed from input queue 16 by an output 22 of the traffic source at a rate r. The bit-stream 24 at the output of peak-rate shaper 14, denoted by a(r,t) is also dependent on peak rate r. The present invention provides a method for computing the burstiness curve of the traffic source at the output of the peak-rate shaper 14 for a specific value of peak rate r.

According to the model, the traffic source output 24 a(r,t) then enters a secondary shaper 26, having a secondary queue 28, with a maximum queue length 30 wherein frames are output at a deterministic output rate 32, denoted by ρ, which is within the range [0,r]. The queue size 30, denoted by $Q_p(r,t)$, may then be observed and the maximum queue length, denoted by σ(r,ρ), determined. It is this maximum queue length for this secondary queue that corresponds with the burstiness of the traffic source for the given rate ρ. The strategy for obtaining the burstiness curve within the present invention is to analytically derive the maximum queue length $\sigma(r,\rho) = \max_t(Q_p(r,t))$ for different values of rate ρ. The burstiness curve need not be determined for all possible values of rate ρ to obtain an exact computation of the curve, thus minimizing both time and space requirements for the determination methods.

Computation of on-off periods for bit-stream a(r,t) at the output of the peak-rate shaper 14 is first performed. By way of example, the input source is considered an elementary video stream whose computed on-off periods are subsequently utilized within the burstiness curve computation.

An active period is defined as a maximal period of time during which the peak-rate shaper is continuously transmitting traffic and corresponds with an on-period of the signal a(r,t). Denoting the number of active periods is $n_a(r)$, which is given for a peak rate of r, wherein $S_i^r$ is the time instant at which the i-th active period commences, and $t_i^r$ is the instant at which the time period ends. To capture the dynamics of the bit-stream a(r,t) generated at the output of the peak-rate shaper for a specific peak rate r, the active periods $(s_i^r, t_i^r)$, for $1 \leq i \leq n_a(r)$ are computed.

It is assumed that the number of frames in the video trace is N, the length of the trace is T, the frame rate is $f$, the size of the i-th frame is $d_i$ bits, and that $d_{max} = \max(1 \leq i \leq N) d_i$ is the maximum frame size in the trace. Additionally, it is assumed that frames are immediately added to the shaper queue upon generation. Upon the peak rate r satisfying the relationship $$r \geq \left(\frac{d_{max}}{f}\right),$$

it becomes trivial to compute the active periods of the signal a(r,t).

$$s(r) = d_{max}, \ n_a(r) = N_1, \ s_i^r = \frac{i}{f}, \ \text{and} \ t_i^r = s_i^r + \frac{d_i}{r} \quad (4)$$

However, in the general case of $$r < \left(\frac{d_{max}}{f}\right),$$

neighboring frames of the stream overlap one another in the shaper queue, leading to larger maximum queue lengths and a reduction in the number of active periods. Letting $q_i(r)$ represent the size of the queue immediately subsequent to arrival of the i-th frame, the maximum queue length always coincides with the arrival of a new frame, and is given by:

$$s(r) = \max_{1 \leq i \leq N} q_i(r) \quad (5)$$

The active periods of the elementary stream can be determined by traversing the sequence of frames and computing the queue size at the instant after each frame arrives. For any given value of peak rate r, the algorithm processes the individual frames of the elementary stream in sequence and computes the maximum queue size s(r), the number of active periods $n_a(r)$, and the starting and ending times of each active period $(S_i^r, t_i^r)$, $1 \leq i \leq n_a(r)$. The active periods of the signal a(r,t) are then utilized to compute the burstiness of the original video stream by observing the queue behavior at the input of second shaper 26 in FIG. 1. The maximum queue size is then determined at the input of second shaper 26 for a given peak rate r and service rate ρ. Since the peak rate r does not change within this method it will generally be omitted for the sake of clarity from the bulk of notations herein.

The peak-rate shaping procedure produces a sequence of active periods for a given peak-rate r. If the output rate of the peak-rate shaper is denoted by m(t), then:

$$m(t) = \begin{cases} r, & t \in [s_i, t_i]; \\ 0, & \text{otherwise;} \end{cases} \quad (6)$$

Letting $l_p(t)$ be an indicator function that is defined as follows:

$$I_p(t) = \begin{cases} 1, & \text{if } Q_p(t) > 0; \\ 0, & \text{otherwise;} \end{cases} \quad (7)$$

where $Q_p(t)$ denotes the queue size at time t of the server at the output of the peak-rate shaper for rate ρ.

A busy period is then defined as a maximal period of time during which the queue of the server at the output of the peak-rate shaper is non-empty, that is, an on-period of the indicator function $I_p(t)$. The notation $\alpha_i, \beta_i$ is utilized for the starting and ending times of busy period i. Letting $Q^*(\rho)$ denote the maximum queue size reached at this queue over the entire duration of the video stream, the method estimates $Q^*(\rho)$ based on the observation that if the maximum queue size occurs in some busy period i when the rate is ρ, then $Q^*(\rho)$ will vary linearly with the rate ρ until one of the following events occur:

1. maximum queue size moves to a different instant within the same busy period;
2. maximum queue size moves to a different busy period; or
3. number of busy periods changes.

The three cases above are the instances in which the slope of the burstiness curve may change as the rate ρ is increased towards its maximum value r. This can be illustrated with an example.

Figure 2:
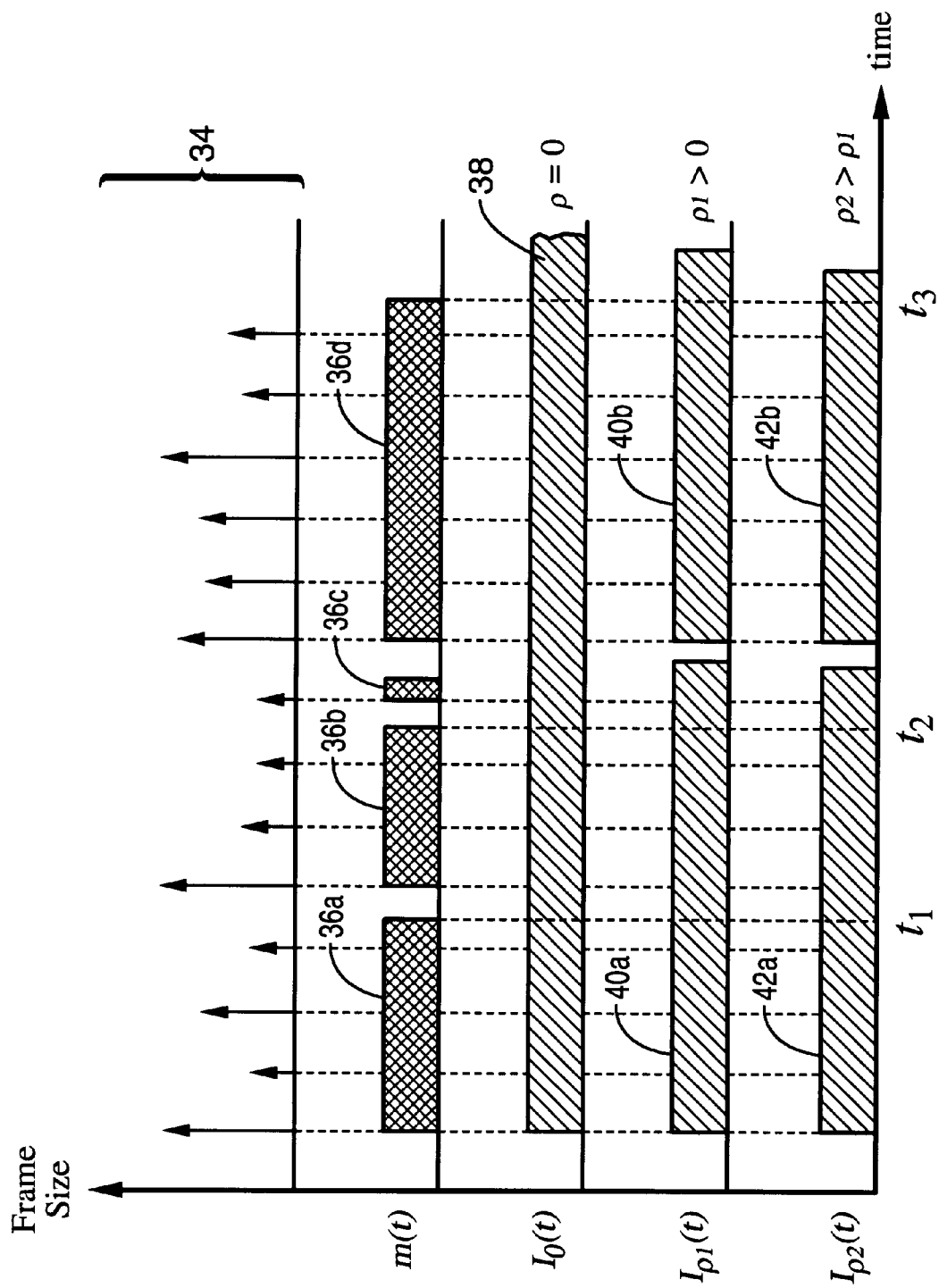
FIG. 2 is a diagram of busy periods exemplified within an elementary video stream.

FIG. 2 shows a sequence of frames of various sizes 34 and the generated active periods 36a–36d created when the sequence of frames is shaped by the peak-rate shaper with rate r, and the resulting busy periods 38, 40a, 40b, 42a, 42b at the input of the server operating at a rate ρ. When the rate ρ of the server is zero, as denoted by $I_0(t)$, the queue of the server accumulates all the data which has arrived during the active periods in a single extended busy period 38. Therefore, the maximum queue size occurs at the end of the last active period $t_3$, for instance when all data has arrived.

As the rate of the server increases to $\rho_i$, as denoted by $I_{p1}(t)$, the busy period shrinks until it splits into two busy periods 40a, 40b. Assuming that the maximum queue size occurs at time $t_2$ for rate $\rho_1$, which is at the end of the second active period 36b, it will be appreciated that the maximum queue size always occurs at the end of an active period. On increasing the rate further, the busy periods of $I_{p1}(t)$ shrink without breaking and the maximum stays at $t_2$, until rate $\rho_2$ is reached. At rate $\rho_2$, the busy periods of $I_{p2}(t)$ have shrunk further and the maximum moves to time instant $t_1$ while the total number of busy periods 42a, 42b remain unchanged.

For a video stream of finite duration, the values of the rate ρ that cause either a break in a busy period or the maximum queue size to be moved to a different location form a finite set. The rates belonging to this set are the only ones that need to be computed to exactly compute the burstiness curve, since the burstiness curve is piecewise linear between adjacent rate points belonging to this finite set.

Sending the video stream to a server with a zero rate results in a maximum queue length σ(0) which contains the sum total of data generated by the video stream. Similarly, when the service rate ρ becomes equal to the peak rate r, the queue length will remain at zero, σ(0)=0. For any intermediate rate ρ, $0<\rho<r$, the busy periods at the server need to be identified in relation to service rate ρ, and the local maximum queue lengths calculated for each busy period. The maximum among them corresponds to the global maximum queue length σ(ρ).

Fortunately, the procedure need not be utilized for all possible rates in the interval (0,r). Instead, a new calculation of the maximum queue size is required only at rate points where (1) the instant at which the maximum queue size occurs moves, or (2) one of the busy periods breaks into two or more smaller busy periods. It can be shown that the burstiness curve is linear between the given points.

Lemma 1—The burstiness curve of an elementary video stream is piecewise linear. The slope of the burstiness curve changes only at rate points where one of the following events occurs:

1. a change in the time instant at which the maximum queue size σ(ρ); or
2. a change in the number of busy periods.

Consider two distinct rates $\rho_1$ and $\rho_2$, with $\rho_1<\rho_2$, such that (a) the number of busy periods remains the same at $\rho_1$ and $\rho_2$, and (b) the global maximum queue size occurs at the same instant $\tau_k$ for $\rho_1$ and $\rho_2$. Assume that $\tau_k$ belongs to busy period k. Letting $\alpha_k$ be the starting time of this busy period, then, for any rate ρ in the range $\rho_1<\rho\leq\rho_2$, the queue size at time $\tau_k$ is given by:

$$Q_\rho(\tau_k)=W(\alpha_k,\tau_k)-\rho(\tau_k-\alpha_k) \qquad (8)$$

where $W(\alpha_k,\tau_k)$ is the amount of traffic arriving into the queue during the interval $(E_k,\tau_k)$. Thus, for any rate ρ, wherein $\rho_1\leq\rho\leq\rho_2$, the following relationships exist:

$$Q_\rho(\tau_k)=W(\alpha_k,\tau_k)-\rho_1(\tau_k-\alpha_k)-(\rho-\rho_1)(\tau_k-\alpha_k) \qquad (9)$$

$$Q_\rho(\tau_k)=Q_{\rho 1}(\tau_k)-(\rho-\rho_1)(\tau_k-\alpha_k) \qquad (10)$$

Therefore, the plot of $Q_\rho(\tau_k)$ with respect to ρ in the range $\rho_1\leq\rho\leq\rho_2$ is a straight line with slope $-(\tau_k-\alpha_k)$, which verifies the assertion.

Thus, the entire burstiness curve of the elementary stream may be characterized by starting from zero rate and progressively finding rate points at which either the maximum queue size moves to a different time instant, or a break opens up within a busy period. A straight-forward approach can be provided by examining all active periods within each busy period, since the maximum queue size occurs at the end of any active period. However, the approach may be improved upon by considering that the local maximum queue size within any busy period can move only to an earlier time instant when the rate ρ is increased. The following lemma proves this result formally.

Lemma 2—Letting $\tau_k$ and $\tau_k'$ be the time instants at which the local maximum queue sizes occur within busy period k for rates ρ and ρ', respectively, with ρ'>ρ. If the number of busy periods in the elementary video stream remains the same at rates ρ and ρ', then $\tau_k'\leq\tau_k$.

Since two busy periods can never merge into a single busy period when the rate is increased, the starting times of the busy periods are identical at rates ρ and ρ'. The following proves the lemma by contradiction. Assume, if possible, that $\tau_k'\leq\tau_k$ and letting $W(\tau_k,\tau_k')$ denote the amount of traffic that arrived into the queue during the interval $(\tau_k,\tau_k')$. Since the interval $(\tau_k,\tau_k')$ belongs to a single busy period, the queue size $Q_\rho(\tau_k')$ at time $\tau_k'$ is given by:

$$Q_\rho(\tau_k')=Q_\rho(\tau_k)+W(\tau_k,\tau_k')-\rho(\tau_k'-\tau_k) \qquad (11)$$

Similarly, for the rate ρ' queue size is given by:

$$Q_{\rho'}(\tau_k')=Q_{\rho'}(\tau_k)+W(\tau_k,\tau_k')-\rho'(\tau_k'-\tau_k) \qquad (12)$$

Since $Q_{\rho'}(\tau_k')$ is a local maximum for the k-th busy period, the following relationship would then hold:

$$Q_{\rho'}(\tau_k')\geq Q_{\rho'}(\tau_k) \qquad (13)$$

Therefore, the following is derived from Eq. (12) and Eq. (13):

$$W(\tau_k,\tau_k')\geq\rho'(\tau_k'-\tau_k) \qquad (14)$$

$$W(\tau_k,\tau_k')>\rho(\tau_k'-\tau_k),\text{ since } \rho'>\rho \qquad (15)$$

From Eq. (11) and Eq. (15), the following relationship results:

$$Q_\rho(\tau_k')>Q_\rho(\tau_k) \qquad (16)$$

The above equation provides a contradiction to the hypothesis that the local maximum queue size at rate ρ occurred at time $\tau_k$, and concludes the proof of Lemma 2. It should be appreciated that Lemma 2 applies even for multiple identical maxima within the same busy period, wherein the earliest maximum may be selected so as to minimize the required computational efforts. Utilizing Lemmas 1 and 2 enable a computation method to be created which provides an exact computation of the burstiness of the elementary stream by identifying values of the rate ρ at which the slope of the burstiness curve changes.

Figure 3:
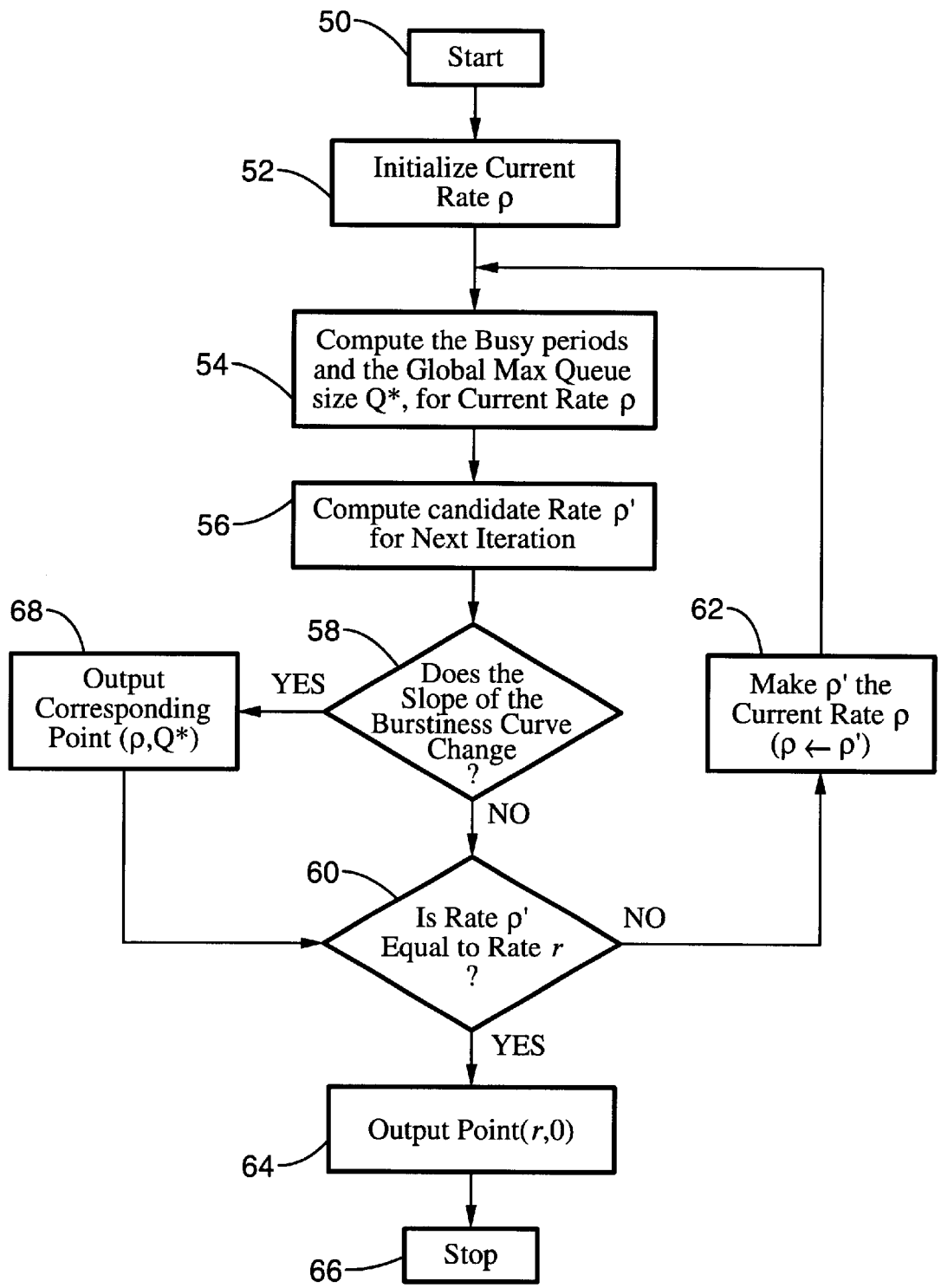
FIG. 3 is a flowchart of a burstiness curve determination method according to the present invention.

FIG. 3 provides an example of the described method for determining burstiness according to the present invention. It should be appreciated that the routine associated with the flowchart of FIG. 3 may be implemented for execution on a wide variety of systems which are capable of performing computations. The method is associated with the model shown in FIG. 1. Starting at block 50 the current rate ρ is set to zero at block 52. The busy periods are computed, block 54, for current rate ρ and the corresponding maximum queue size Q*. Block 56 shows computation of candidate rate ρ' for the next iteration of the method. The slope of the burstiness curve is checked, block 58. If no change in slope has occurred, then at block 60, the rate ρ' is checked for equality with rate r, which provides the upper bound on the rate ρ. If the rates are not matched, the rate ρ' is substituted for the current rate ρ and another iteration of the loop commences at block 54 with the computation of busy periods. If the rates at block 60 match, then a point (r,0) is output at block 64, and the program terminates at block 66. Returning to block 58, if a change in slope is detected then block 68 is executed and the corresponding point (ρ,Q*) is output, prior to testing for rate ρ' being equivalent to rate ρ in block 60. Therefore, looping iterations continue within the method until the rate ρ reaches the peak rate r. The burstiness curve is obtained by connecting the global maximum queue size at all such output points by linear segments.

FIG. 4 through FIG. 9 provide pseudocode embodiments of the exact computation method implemented for elementary video streams. FIG. 4 exemplifies the determination of active periods within an elementary video stream which allows capturing of the bit-stream a(r,t) dynamics generated at the output of the peak-rate shaper for a specific peak rate r. For any given value of peak rate r, the routine processes the individual frames of the elementary stream in sequence and computes the maximum queue size s(r), the number of active periods $n_a(r)$, and the starting and ending times of each active period $(s_i^r,t_i^r)$, $1\leq i\leq n_a(r)$. The active periods of the signal a(r,t) are then utilized to compute the burstiness of the original video stream by observing the queue behavior at the input of second shaper 26 in FIG. 1 which also shapes the video stream. FIG. 5 exemplifies a routine for computing the burstiness curve of an elementary video stream which follows the flowchart of FIG. 3. The burstiness computation calls compute_next_rate( ) which determines the points at which the slope of the burstiness curve may change. The function compute_next_rate( ) can be configured for providing an exact burstiness curve, or modified to limit the subject points at which the slope may change and thereby provide an approximate burstiness curve. The routine compute_next_rate( ) is embodied herein with both exact and approximate methods for each of the embodied streams, specifically elementary and MPEG-2 transport streams. It will be appreciated that the burstiness computation routine of FIG. 5 is performed after the active periods for a particular rate are determined, which was exemplified in the routine of FIG. 4, as these active periods are utilized within the function compute_busy_periods( ) whose pseudocode is given in FIG. 6. The function compute_busy_periods( ) computes the busy periods of the stream for a given value of rate $\rho$. The method operates over a given sequence of active periods and has the current rate $\rho$ as its input. The method traverses the active periods and identifies each busy period j by calculating its starting and ending times, denoted by $\alpha_j$ and $\beta_j$, respectively. The function checks whether it should start a new busy period by checking the queue size Q at the beginning of the next active period, denoted by $s_{i+1}$. Upon queue underflow (size less than zero), a new busy period is started. The function additionally records the local maximum queue size $Q_j^*$ for each busy period j, and the global maximum $Q^*$. FIG. 7 is a pseudocode routine compute_next_rate( ) which determines prospective slope changes within an exact burstiness curve. The function starts with the calculation of the lowest rate at which any busy period computed in the previous step breaks. It also computes the lowest rate at which the global maximum queue size moves to a different time instant, either within the same busy period or in a different one. In the case that the global maximum queue size stays within the same busy period, it can be moved to an earlier time instant to reduce computational effort. Otherwise, if the global maximum moves to a different busy period, its new position must either coincide with the location where the local maximum queue size occurred at the previous rate point, or at an earlier instant. The function compute_next_rate( ) of FIG. 7 selects the minimum rate among all these candidates as the rate point for the next iteration of the method. Functions for computing both $\rho_{j1}$ and $\rho_{j2}$ are called by compute_next_rate( ) in examining rates for prospective slope changes. FIG. 8 exemplifies the computation of $\rho_{j1}$ which defines the lowest rates at which the busy period breaks into multiple periods. FIG. 9 exemplifies a routine for computing $\rho_{j2}$ which defines the lowest rate at which the global maximum queue size moves to a different time instant.

The worst-case time-complexity and space-complexity of the method can be determined by considering the computations performed at each rate point. A number of steps, given by $O(n_a)$, are required to compute all the busy periods for a specific rate $\rho$, where $n_a$ is the number of active periods. The number of candidate rates that need to be considered during each iteration to identify the next rate point is also $O(n_a)$, since a check is always performed for candidate rates at the boundaries of the active periods. Therefore, the worst-case time complexity of the method is $O(n_a^2)$. The space needed to store the output of the method is proportional to the number of rate points, and cannot exceed the number of active periods $n_a$, and therefore the space complexity is $O(n_a)$. In contrast, when determining burstiness with simulation techniques, the time complexity becomes $O((r/\delta)n_a)$, where $\delta$ is the chosen rate granularity for the burstiness curve and the corresponding space complexity becomes $O(r/\delta)$ which does not depend on the number of active periods $n_a$. Note that the burstiness curve obtained by simulation of the source behavior at each rate point is not exact, but only an approximation that depends heavily on the rate granularity $\delta$ chosen.

The worst-case space complexity of $O(n_a)$ according to the present invention is rather conservative, describing that which may occur in extreme cases such as when the frame sizes form an increasing function of time. In the case of MPEG elementary streams, however, the space complexity is mainly governed by the Group-of-Pictures (GOP) structure which yields average complexity substantially lower than the worst-case value. Therefore, in such cases, the space complexity becomes $O(\alpha N_{gop})$, where $\alpha$ is a constant that depends on the number of scene changes in the video stream, and $N_{gop}$ the number of frames in the GOP structure. The constant $\alpha$ has values close to unity when the scenes are fairly static, and increasingly higher values for streams that exhibit higher rate variability due to scene changes. The method presented above can be slightly modified for computation of the burstiness curve of MPEG-2 transport streams.

The MPEG standard defines a way of multiplexing more than one stream (video or audio) to produce a program. A program is considered a single service entity, and consists of one or more elementary streams. Elementary streams are considered the basic entities of a program. An elementary stream may comprise an MPEG-encoded audio or video stream, or a non-MPEG stream such as teletext or other information that is offered by a specific service provider.

Two schemes are utilized within the MPEG-2 standard for the multiplexing process. (1) A program stream which is similar to the MPEG-1 Systems Layer, which provides a grouping of elementary streams that have a common time-base for delivery, wherein each program stream consists of only one program. (2) A transport stream which combines one or more programs into a single stream with fixed-size packets, wherein the programs may or may not have a common time-base. The MPEG-2 transport stream format is the preferred choice in environments where errors are likely to occur, as in the case of transport over a packet-switched network. The transport stream format is currently utilized within Digital Video Broadcasting™ (DVB) systems for digital television and data broadcasting across a broad range of delivery media. The format makes use of explicit timestamps (called Program Clock References or PCRs in MPEG-2 terminology) embedded within the transport packets to facilitate the clock recovery at the receiver.

Figure 10:
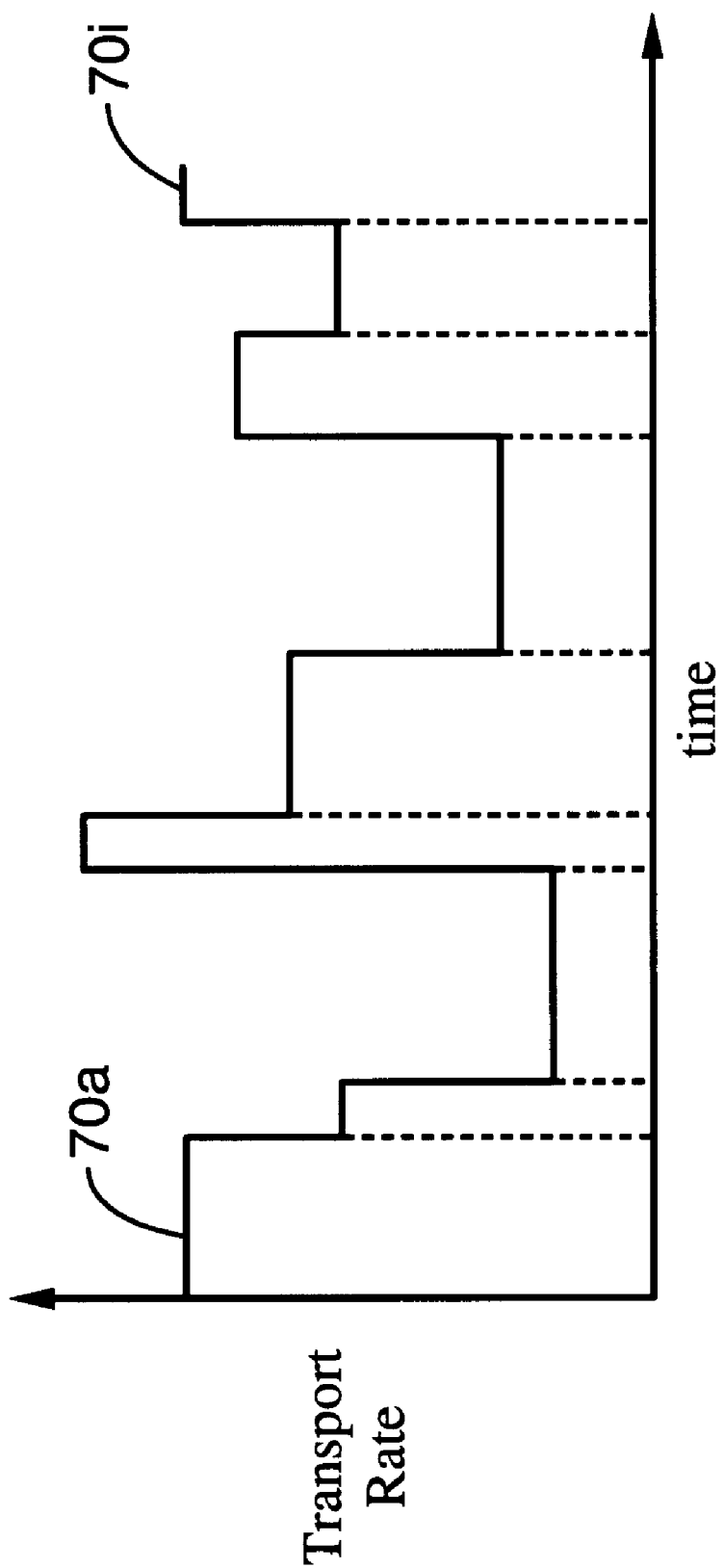
FIG. 10 is a chart exemplifying transport rate variation within an MPEG-2 transport stream.

FIG. 10 shows changes to the transport rate within segments 70a through 70i of a transport stream. The transport rate of a transport stream may be alternatively fixed, however, in either case it retains the important property of being piecewise constant. The rate of the transport stream changes only at the specific instants when a new PCR value is received at the receiver. During an interval between such rate changes, the transport rate can be computed as follows:

transport_rate(i)=(no. of bytes between PCRS)×system clock frequency (17)

$PCR_{new} - PCR_{old}$ (18)

Therefore, during the time interval between the reception of two consecutive PCRs, the rate remains constant and the time interval is herein referred to as a "rate segment". The rate segment property is taken advantage of in designing an efficient method for computing the burstiness curve. The method is based on observing the queue behavior at the input of the second shaper 26, as shown in FIG. 1 which exemplifies the case of an elementary video stream. In the case of MPEG-2 transport streams it will be appreciated that the peak-rate shaping process does not introduce additional delay if the peak rate is set greater than or equal to the maximum rate found in the stream. The algorithm for calculating the maximum queue size at the input of the second shaper ($\max_t(Q_p(r,t))$) for a peak rate value r greater than or equal to the maximum rate found in the stream, and service rate $\rho$, may be arrived at as follows.

Letting T be the total duration of the MPEG-2 transport stream and m(t) the instantaneous rate at time t, where $0 \leq t \leq T$. It is assumed that the peak rate r is greater than or equal to the maximum rate of the stream. The number of rate segments is denoted by $n_r$, the time instant at which the i-th rate segment commences is denoted by $s_i$, and the time when the segment ends is denoted by $t_i$, wherein the relationship, $S_{i+1} = t_i$ exists. Letting $r_i$ be the transport rate within the i-th segment, and further letting $r_{min}$ and $r_{max}$ be the respective minimum and maximum among $r_i$, the relationship may be written as:

$$r_{min} = \min_{1 \leq i \leq n_r}(r_i) \text{ and } r_{max} = \max_{1 \leq i \leq n_r}(r_i) \tag{19}$$

The same indicator function $I_p(t)$ is also utilized as defined in Eq. (7). Again the busy period is defined as a maximal period of time during which the queue of the server at the output of the peak-rate shaper is non-empty. Letting $Q^*(\rho)$ denote the maximum queue size reached over the entire duration of the MPEG-2 transport stream. The algorithm for estimating $Q^*(\rho)$ is based on the observation that, if the maximum queue size occurs in a busy period i when the rate is $\rho$, then the variation of the maximum queue size with respect to $\rho$ will be linear between rate points given by the occurrence of one of the following events:

1. maximum queue size moves to a different instant within the same busy period, or to a different busy period;
2. number of busy periods changes; or
3. starting time of a busy period moves.

It should be recognized that the third event case outlined above is different for a transport stream in relation to an elementary stream. While an active period in an elementary stream always belongs to a busy period, a rate segment in the transport stream may not belong to a busy period if the arrival rate during the segment is less than the service rate $\rho$. Hence, as the service rate $\rho$ is increased, the starting times of some busy periods may move to the right.

Figure 11:
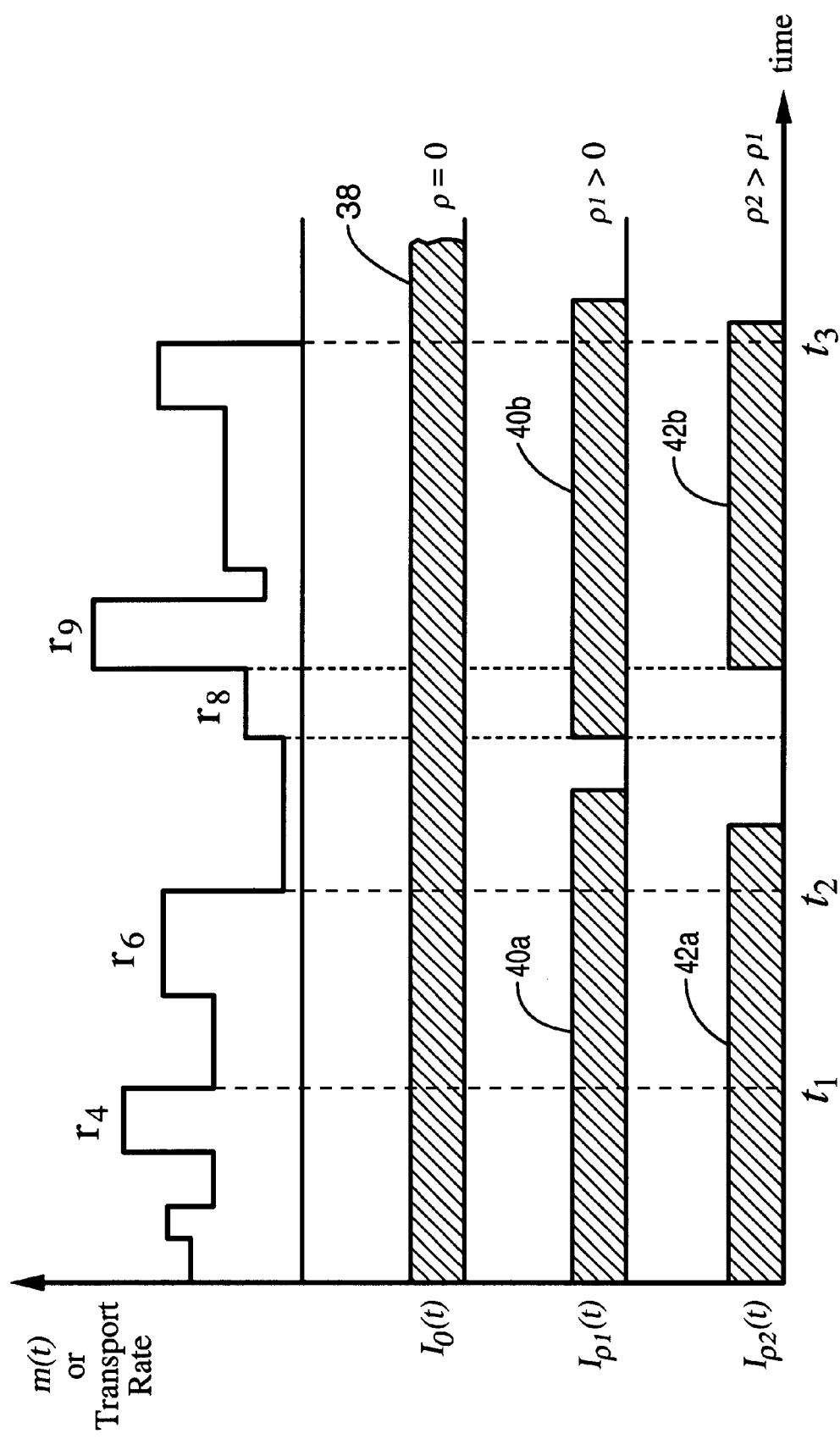
FIG. 11 is a diagram of busy periods exemplified within an MPEG-2 transport stream.

FIG. 11 shows an example of the busy periods 40b, 42b moving to the right, wherein the transport rate m(t) within each rate segment of the MPEG-2 transport stream and the resulting busy periods at the input of the server operating at rate $\rho$. Rate segments are shown at the top of FIG. 11, some of which are labeled, such as $r_4$, $r_6$, $r_8$, and $r_9$. When the rate $\rho$ of the server is zero, the queue of the server accumulates all the data which has arrived for the trace in a single large busy period 38. Therefore, the maximum queue size occurs at the end of the last rate segment. As the rate of the server increases to $\rho_1$, the busy period shrinks until it splits into two busy periods 40a, 40b. Assuming that the maximum queue size occurs at a time $t_2$ for rate $\rho_1$ which occurs at the end of rate segment $r_6$. On increasing the rate further, the busy periods of $I_{p1}(t)$ continue to shrink without separating whereas the maximum remains at $t_2$, until such time as the rate $\rho_2$ is reached. Assuming that $\rho_2 > r_8$, the second busy period commences at the beginning of rate segment $r_9$, since no accumulation in the queue can occur during rate segment $r_8$. At rate $\rho_2$, the maximum queue size moves to time instant $t_1$ while the total number of busy periods stays unchanged. It will be appreciated that the maximum queue size always occurs at the end of a rate segment, the maximum queue size can never occur in a rate segment i which has $r_i < \rho$, and a busy period always commences in a rate segment i which has $r_i > \rho$.

For an MPEG-2 transport stream of finite duration the values of the rate $\rho$ that cause a break in a busy period, or a movement of the maximum queue size to a different location, or a movement of the beginning of a busy period, collectively form a finite set. It will be appreciated that only the rates belonging to this set need to be considered in producing an exact computation of the burstiness curve because the burstiness curve is piecewise linear between adjacent rate points which belong to this finite set.

Lemma 3—The burstiness curve of an MPEG-2 Transport Stream is piecewise linear. The slope of the burstiness curve changes only at rate points wherein one of the following events occurs:

1. a change in the time instant at which the maximum queue size $\sigma(\rho)$ occurs;
2. a change in the number of busy periods; or
3. a change in the starting time of a busy period.

The proof of Lemma 3 is similar to that of Lemma 1 and is therefore omitted.

The notation $\alpha_i, \beta_i$ is utilized for the respective starting and ending times of busy period i. The linear segments of the burstiness curve need only be identified between rates $r_{min}$ and $r_{max}$, since the slope cannot change during the intervals $[0, r_{min})$ and $(r_{max}, r]$. Thus, the entire burstiness curve of the MPEG-2 transport stream may be characterized starting from rate $r_{min}$ and progressively finding rate points at which either the maximum queue size moves to a different time instant, a break in a busy period occurs, or the starting time of a busy period shifts to a different point. As in the case of elementary video streams, the local maximum queue size within any busy period can shift only to an earlier time instant when the rate $\rho$ is increased.

Lemma 4—Letting $\tau_k$ and $\tau_k'$ be the time instants at which the local maximum queue sizes occur within busy period k for rates $\rho$ and $\rho'$, respectively, with $\rho' > \rho$. If the number of busy periods in the MPEG-2 Transport Stream remains the same at rates $\rho$ and $\rho'$, then $\tau_k' \leq \tau_k$. The proof is similar to that of Lemma 2 and is therefore omitted.

FIG. 12 through FIG. 16 provide pseudocode embodiments of the exact computation method implemented for MPEG-2 transport streams. FIG. 12 exemplifies a routine based on the above results which determines the rate points at which the slope of the burstiness curve changes. The routine starts by setting the rate $\rho$ to the minimum rate of the transport stream segments, $r_{min}$. The method determines the busy periods corresponding to the current rate $\rho$. FIG. 13 exemplifies a routine for computing the busy periods which examines candidate rate points at which the global maximum queue size shifts, a busy period breaks into multiple periods, or the starting time of a busy period changes. The minimum among these candidate rates being the next point in the burstiness curve. FIG. 14 exemplifies a routine for computing the next rate and is implemented for assessing all possible points of slope change in accord with an exact burstiness computation. FIG. 15 exemplifies the computation of $\rho_{j1}$ which defines the lowest rates at which the busy period breaks into multiple periods. FIG. 16 exemplifies a routine for computing $\rho_{j2}$ which defines the lowest rate at which the global maximum queue size moves to a different time instant. The entire burstiness curve according to the routine of FIG. 12 is obtained by repeating this process iteratively until the maximum rate $r_{max}$ is determined. The method takes a sequence of rate segments and the current rate $\rho$ as its input. It traverses the rate segments and identifies the starting and ending times of each busy period by maintaining the accumulated queue size over the duration of the stream. The function identifies the start of a rate segment as the start of a new busy period when the accumulated queue is empty at the beginning of the rate segment and the rate of the segment is higher than the current rate $\rho$. The busy period ending when the accumulated queue size becomes zero. Returning to FIG. 14 and the function compute_next_rate( ), for each busy period corresponding to the current rate, the function first calculates the lowest rate at which the busy period breaks into multiple periods. Subsequently, it computes the lowest rate at which the global maximum queue size shifts to a different time instant, either within the same busy period, or within a different period. Finally, it also finds the minimum among the rates of the stream at the beginning of each busy period, which mark the next rate point at which the starting point of a busy period moves. The method chooses the minimum among all these candidates as the next rate point.

As in the case of the previous method, the worst-case time complexity of this method is $O(n_r^2)$ Each iteration requiring $O(n_r)$ steps, while the number of iterations is also given by $O(n_r)$, where $n_r$, is the number of rate segments present in the MPEG-2 transport stream. The latter arises from the observation that the candidate rates for the next step are always computed at the boundaries of the rate segments. In addition, the space necessary for storing the output is also given by $O(n_r)$ since, in the worst case, one point may be stored for each rate segment. In practice, however, the space complexity of the method is likely to be much less than $O(n_r)$, due to the fact that the rate segments may exhibit some periodicity similar to the GOP structure of the MPEG elementary video streams. In contrast, simulation techniques have a time complexity of $O((r_{max}/\delta)n_r)$ and space complexity of $O(r_{max}/\delta)$, where $\delta$ is the rate granularity.

The aforementioned methods produce the exact burstiness curve with the minimum number of points. The exact computation, however, requires the identification of all candidate rate points in which the maximum queue size may shift to a different location, a busy period may break, or the starting time of a busy period may change (for transport streams). In practice, however, the burstiness curve can be approximated by considering a subset of these events. Experiments were performed on real video traces in association with the present invention, wherein it was found that the location of the maximum queue size rarely moved when a break occurred in a different busy period. Similarly, a change in the location of the maximum queue size from one busy period to another nearly always occurred as a result of a break occurring in a former busy period. Thus, the methods in the previous section may be closely approximated by considering only candidate rate points at which one of the following events occur:

1. a break in the busy period occurs where the current global maximum queue size is located;
2. a change in the location of the maximum queue size occurs within the same busy period; or
3. a change in the starting time of a busy period occurs (for transport streams only).

FIG. 17 exemplifies a routine for computing rate points for use in characterizing an approximate burstiness curve for an elementary stream, while FIG. 18 exemplifies a routine for computing rate points for use in computing an approximate burstiness curve for an MPEG-2 transport stream. Experiments performed with numerous video traces indicate that the approximate methods can speed burstiness computation, in relation to the exact method, by orders of magnitude while producing burstiness curves that are nearly indistinguishable from those produced by the exact methods.

Experiments were performed with the burstiness computation methods according to the present invention and the results provide insights into the utility and benefits associated with the present inventive methods, and in comparison with performance information obtained from simulations. The following descriptions primarily focus on tests performed with elementary video streams. However, it will be appreciated that due to the similarity of the algorithms the results arrived at for MPEG-2 transport streams, along with other streams, are expected to provide similar benefits.

In one test three separate video traces were considered: (1) an elementary video stream in NTSC format consisting of 2,335 frames, with a total duration of 78 seconds; (2) an elementary video stream in PAL format with 21,763 frames and 14.5 minutes; and (3) a long trace consisting of 174,136 frames with a frame rate or 24 Hz, corresponding to a duration of approximately 2 hours. The characteristics of the traces are summarized in Table 1. In all experiments, the peak rate of the shaping mechanism was set to 155 Mbits/second.

The execution times of the exact method for the three traces are shown in Table 1. As expected, the execution time is relatively small for the first two traces, but the fact that the execution time can grow as the square of the number of active periods is evident in the case of the third trace. The number of points in the last column is the number of points in the burstiness curve, and is related to the number of frames in the GOP structure. The relatively large number of points in the long third trace is justified by the nature of the trace, which is a mix of several video segments having diverse characteristics, ranging from frame sequences with little motion to high-action sequences. In all traces, the space required for storing the points of the burstiness curve, for example as metadata in a video file in a video server, is insignificant compared to the actual video trace. As a result, the exact methods are well suited for Video-on-Demand (VoD) servers, as well as others, in which the computation of the burstiness curve can be performed off-line.

Figure 19:
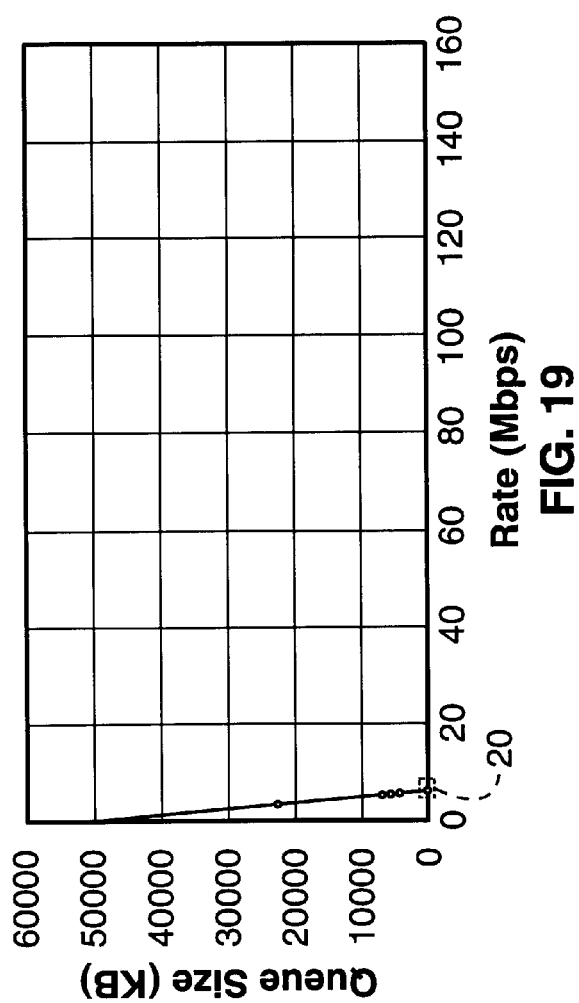
FIG. 19 is a graph of a burstiness curve for an NTSC trace determined according to the present invention.
Figure 20:
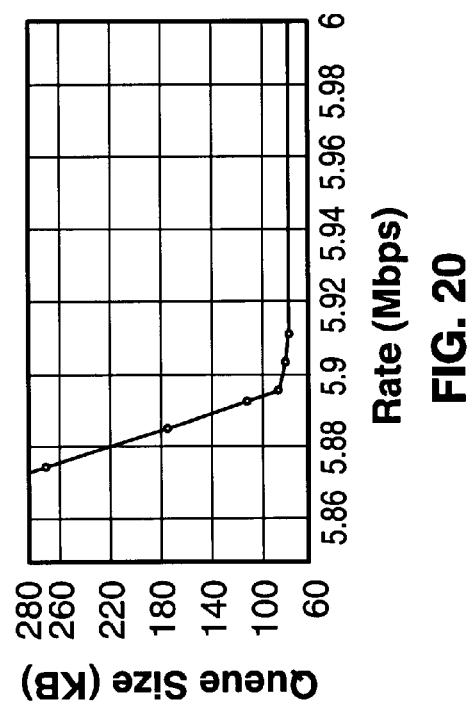
FIG. 20 is a graph detailing a portion of the burstiness curve shown in FIG. 19.
Figure 21:
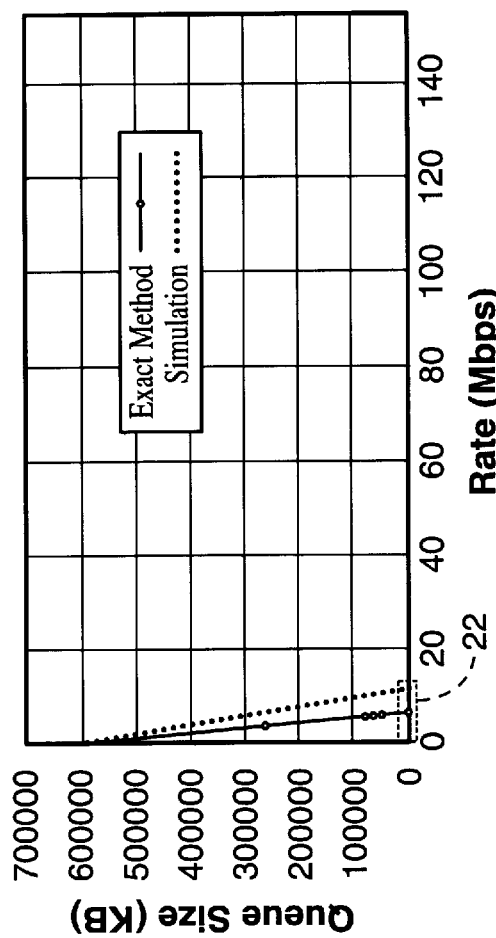
FIG. 21 is a graph of burstiness curves for a PAL trace showing a burstiness curve determined by simulation compared with a burstiness curve determined for the same source by the exact method according to the present invention.
Figure 22:
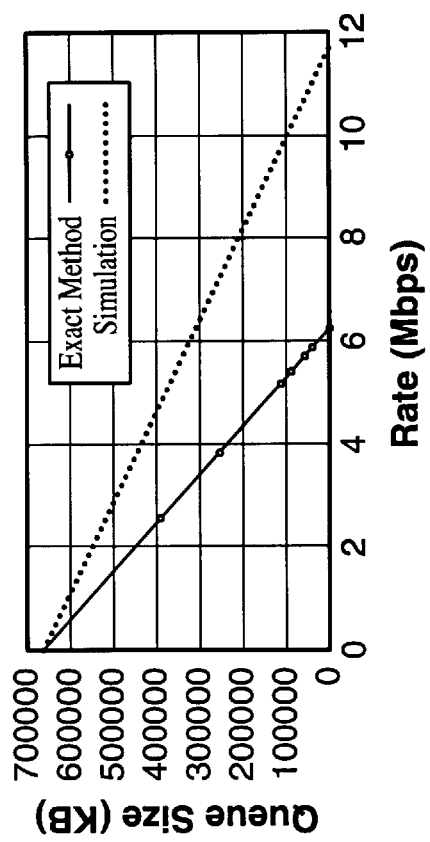
FIG. 22 is a graph detailing a portion of the burstiness curve shown in FIG. 21.
Figure 23:
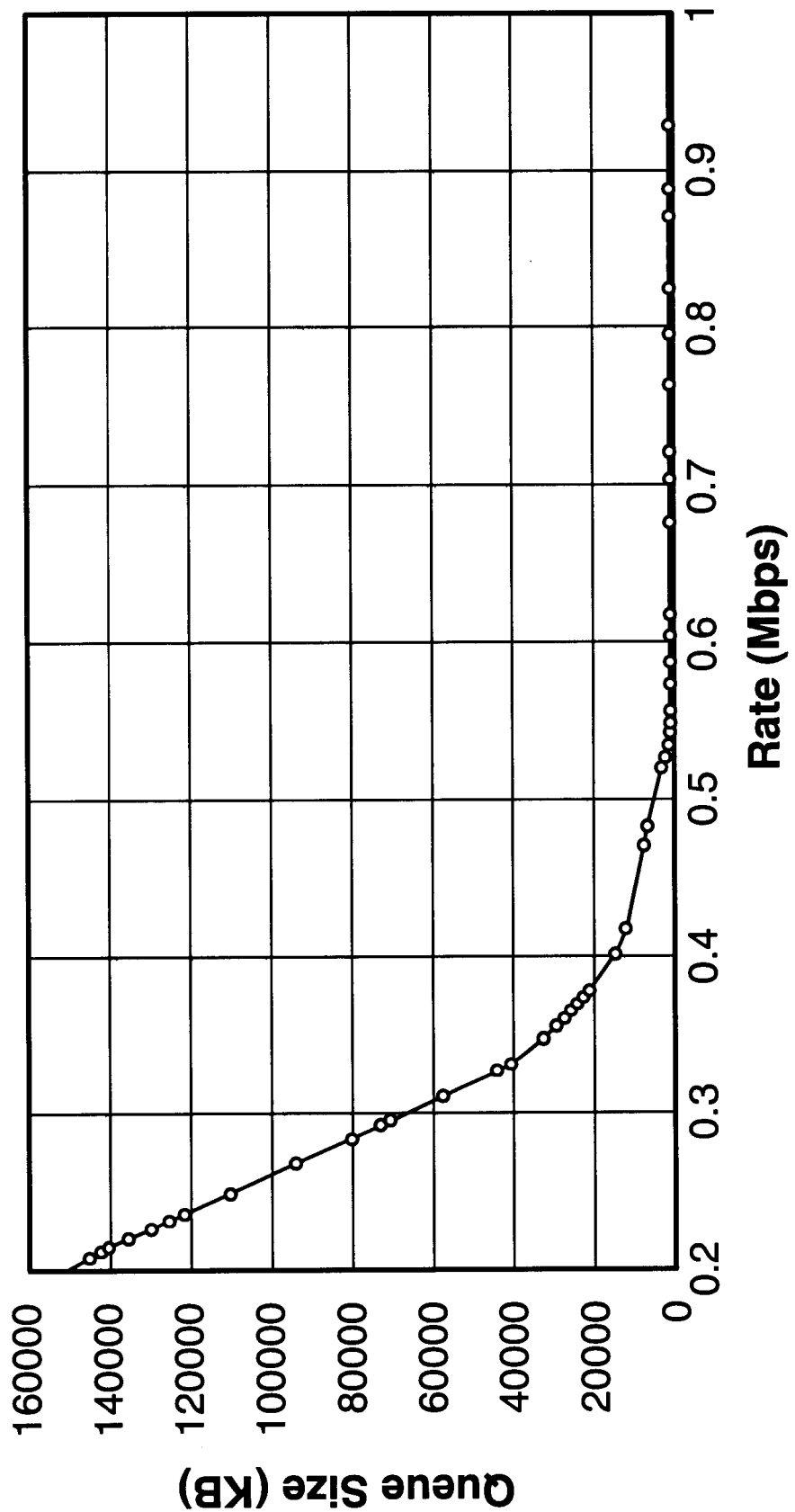
FIG. 23 is a graph of burstiness curves determined for a Garrett's trace which shows a comparison between the results obtained from the exact method and the approximate method.

An interesting observation is that the majority of points computed by the method are concentrated in a small rate interval. FIG. 19 illustrates a burstiness curve for an NTSC trace as computed with the exact method according to the invention. FIG. 20 shows a detailed view of the region of the curve from FIG. 19 centered around 5.9 Mbps wherein a concentration of data points are located. As a result of these point concentrations, the proper use of simulation-based techniques require extremely fine rate-granularities to construct an accurate burstiness curve. However, the use of fine rate-granularities render the simulation techniques inordinately inefficient. For example, if simulations are utilized to compute the burstiness curve of the PAL trace having an identical number of output points, the rate granularity must be at least 155/13=11.92 Mbits/second. The resulting burstiness curve is shown in FIG. 21 along with a burstiness curve computed by the exact method of the present invention. The discrepancy between the two curves is readily seen in the graph of FIG. 21 and a detailed view of a portion of the two curves is depicted in FIG. 22. The exact method computed only the necessary points for the burstiness curve, and thereby provided increased efficiency in relation to the simulation method.

Figure 24:
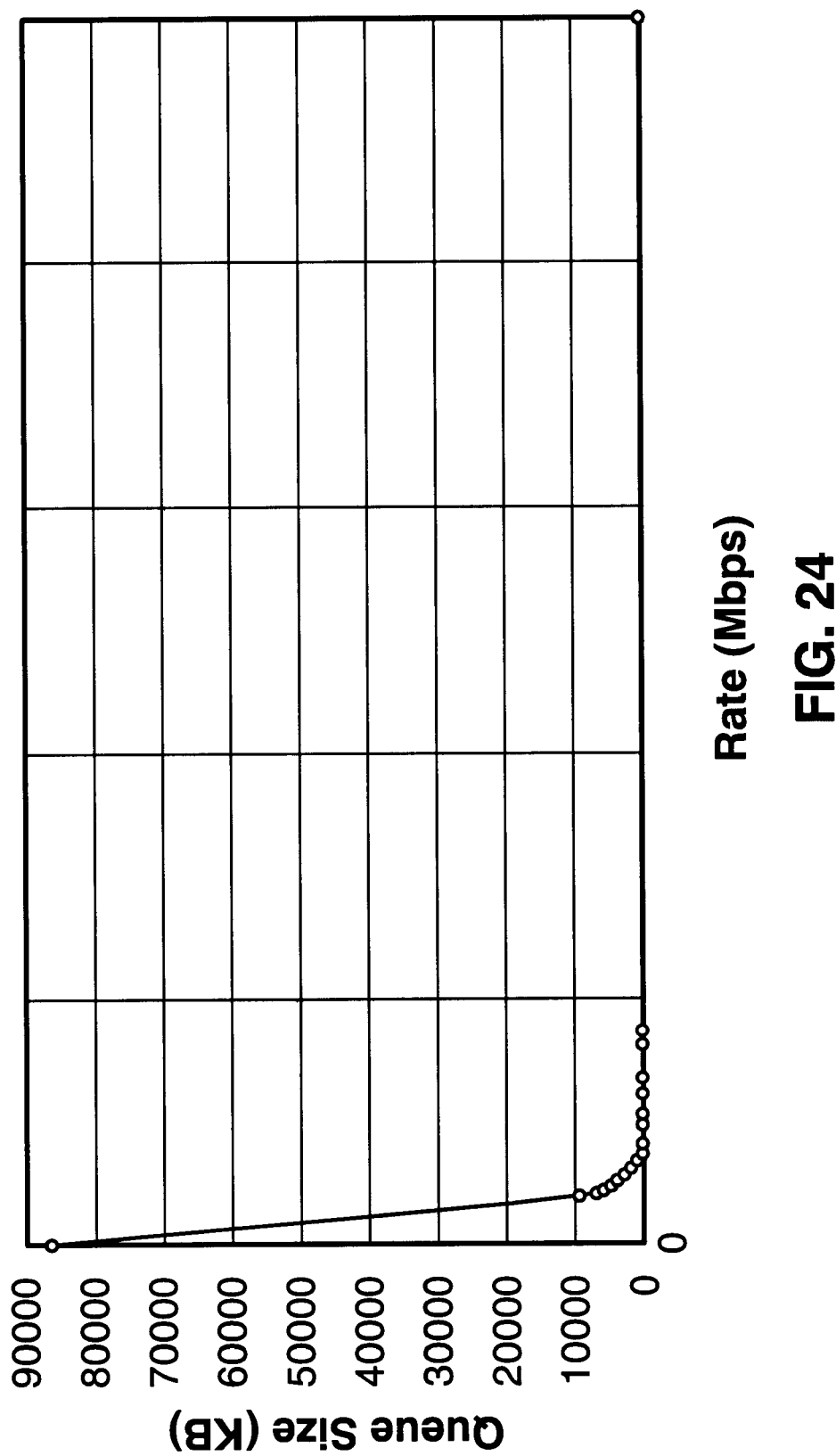
FIG. 24 is a graph of burstiness curves determined for a Mr. Bean trace which shows a comparison between the results obtained from the exact method and the approximate method according to an aspect of the present invention.
Figure 25:
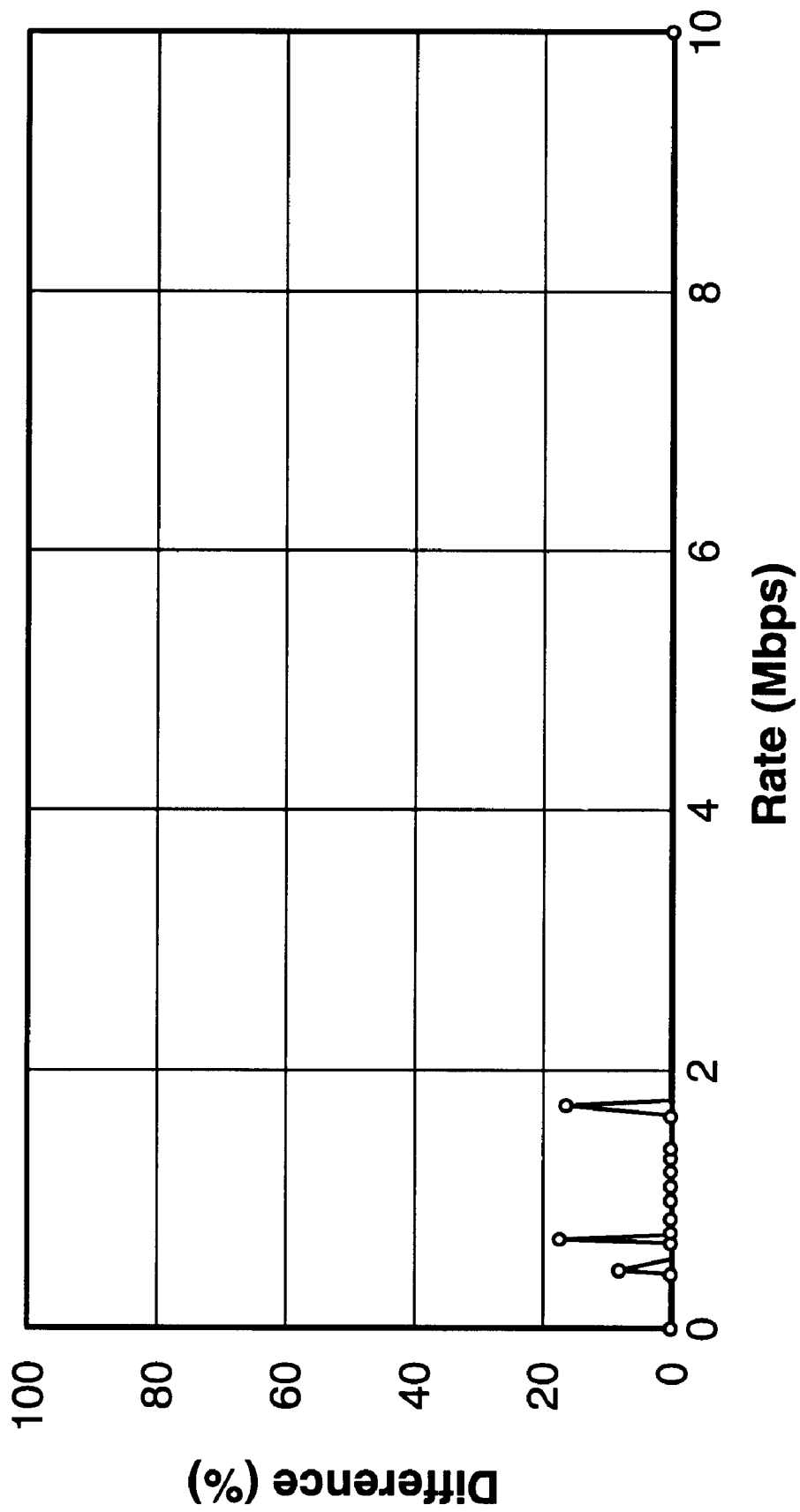
FIG. 25 is a graph of the percentage difference between the burstiness curves calculated for the Mr. Bean trace by the exact method and the approximate method according to aspects of the present invention.

Computing the burstiness curve utilizing the approximate methods according to the present invention yielded results which were close to those obtained from the exact method, however, the results were produced in substantially less time. In the cases of NTSC and PAL traces, the approximate method produced the same set of points as the exact method. The long trace, which was created by Mark Garrett for his thesis entitled "Contributions Toward Real-Time Services On Packet-Switched Networks" was utilized for a portion of the testing, it will henceforth be referred to as "Garrett's trace". Garrett's trace consists of 174,136 frames with a frame rate or 24 Hz and a corresponding duration of approximately 2 hours. In testing the methods with Garrett's trace, the approximate method computed one fewer point (62 points instead of 63), and introduced slight discrepancies in the rate values of three other points. However, the discrepancies were minor as indicated in the zoomed version of the burstiness curve shown in FIG. 23 wherein the two plots completely overlap one another. The difference in the running times of the methods, however, is significant with the approximate method providing a result in 10.6 seconds while the exact method required more than 6 hours to determine the burstiness curve for the long trace. FIG. 24 compares approximate and exact burstiness curves for a trace run for the movie "Mr. Bean" hereafter referred to as the Mr. Bean trace, wherein the points of both curves appear again to overlap one another. FIG. 25 is a plot of the difference between the exact and approximate burstiness curves as computed for the Mr. Bean trace of FIG. 24. The average rate of the trace is 0.441 Mbps and the peak rate is 5.727 Mbps.

The approximate method should be beneficial for providing on-line computation of burstiness curves for real-time video sources such as in video broadcasting. In such cases, the video stream can be segmented to fixed time intervals and the burstiness curve can be obtained for each segment, thereby facilitating per-segment QoS provisioning and call admission control.

To further compare the exact and approximate computation methods, they were applied to several traces obtained from a variety of video programming sources, such as movies and television programming, and the resulting burstiness curves were compared, with the results shown in Table 3. The results suggest that the exact and approximate burstiness curves generally coincide, except for a limited number of points (up to 5 in these experiments) where discrepancies arose. Column 5 of Table 3 provides the maximum absolute difference in the burstiness values of the two curves at any point, and typically the difference was found to be less than 10%. However, a small number of cases were found wherein the maximum difference exceeded 10%. It was found that the larger discrepancies occurred at rate points beyond the normal operating range of the video source. For example, in the case of the Mr. Bean trace, the maximum difference occurred at a rate close to the average rate of the trace, a region typically avoided in practical application. It should be appreciated that the availability of the two methods enables the utilization of a two-step approach for the computation of the burstiness curve, wherein the approximate method can be used to establish the operating range of the video source, while the exact method can be applied over this interval to characterize the video stream precisely.

Accordingly, it will be seen that this invention provides methods for determining the burstiness of a traffic source, such as video or multimedia, which may be utilized within computers and equipment containing computational resources. Specific methods were outlined which were configured to embody computation of burstiness, and burstiness curves for elementary video sources as well as MPEG-2 transport streams. In addition, methods were described for implementation as both an exact computation and an approximate computation. It will be appreciated that the methods described according to the present invention may be implemented for the computation of exact and approximate burstiness curves for a variety of traffic sources, such as may be subject to transmission across a packet-switched network.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Performance results of the exact method for computing burstiness as applied to elementary video streams

| Trace | Frame Rate (Hz) | No. of Frames | Video Length (minutes) | Running Time (h:mm:ss.m) | Space (# points) |
|---|---|---|---|---|---|
| NTSC | 30 | 2335 | 1.3 | 0:00:02.7 | 12 |
| PAL | 25 | 21763 | 14.5 | 0:03:40.7 | 13 |
| Garrett's | 24 | 174136 | 120.9 | 6:19:06.1 | 63 |

TABLE 2

Comparison between the exact and approximate burstiness curve computation methods

| | Exact Method | | Approximate Method | |
|---|---|---|---|---|
| Trace | Time (h:mm:ss.m) | Space (# points) | Time (h:mm:ss.m) | Space (# points) |
| NTSC | 0:00:02.7 | 12 | 0:00:00.0 (reported) | 12 |

TABLE 2-continued

Comparison between the exact and approximate burstiness curve computation methods

| Trace | Exact Method | | Approximate Method | |
|---|---|---|---|---|
| | Time (h:mm:ss.m) | Space (# points) | Time (h:mm:ss.m) | Space (# points) |
| PAL | 0:03:40.7 | 13 | 0:00:00.5 | 13 |
| Garrett's | 6:19:06.1 | 63 | 0:00:10.6 | 62 |

TABLE 3

Comparison between the exact and approximate burstiness curve computation methods for several elementary video streams

| | | | | Comparison | |
|---|---|---|---|---|---|
| Trace | Exact (# Points) | Approx. (# Points) | # Points Difference | Size Difference (KB) | Maximum Difference (%) |
| NTSC | 12 | 12 | 0 | 0.04 | 0.05 |
| PAL | 13 | 13 | 0 | 2.21 | 1.70 |
| Garrett's | 63 | 62 | 1 | 47.47 | 12.08 |
| Mr. Bean | 36 | 31 | 5 | 188.32 | 17.11 |
| asterix | 51 | 50 | 1 | 10.41 | 6.93 |
| atp | 24 | 24 | 0 | 0.14 | 0.36 |
| bond | 43 | 43 | 0 | 7.24 | 5.48 |
| dino | 48 | 48 | 0 | 3.65 | 8.68 |
| lambs | 39 | 39 | 0 | 1.26 | 8.49 |
| mtv1 | 48 | 48 | 0 | 1.45 | 7.04 |
| mtv2 | 30 | 30 | 0 | 15.46 | 7.70 |
| news1 | 34 | 34 | 0 | 5.59 | 2.62 |
| news2 | 40 | 40 | 0 | 0.00 | 0.00 |
| race | 32 | 32 | 0 | 5.18 | 15.02 |
| sbowl | 38 | 38 | 0 | 0.74 | 5.30 |
| simpsons | 28 | 28 | 0 | 2.67 | 7.48 |
| Soccer1 | 33 | 33 | 0 | 384.65 | 13.62 |
| Soccer2 | 43 | 43 | 0 | 1.53 | 7.25 |
| star | 59 | 59 | 0 | 0.31 | 2.27 |
| talk1 | 26 | 26 | 0 | 278.32 | 14.77 |
| talk2 | 33 | 33 | 0 | 0.11 | 0.75 |
| terminator | 29 | 28 | 1 | 5.07 | 8.31 |

What is claimed is:

1. A method of characterizing the burstiness of a traffic source containing digital data, comprising:

feeding an actual or simulated first traffic source into a peak-rate shaper and producing a new time sequence for the bit-stream of the traffic source;

feeding said first traffic source from the output of the peak-rate shaper, m(r,t), into a server with deterministic rate $\rho$ in the range [0,r] where r is the peak rate of the shaper;

observing the dynamics of queue size $Q_p(r,t)$; and recording points of maximum queue length denoted by $\sigma(r,\rho)$ which corresponds to the burstiness of the traffic source for rate $\rho$.

2. A method as recited in claim 1, wherein the traffic source comprises a data stream selected from the group of data streams consisting of multimedia data streams, elementary video streams, and MPEG-2 transport streams.

3. A method of determining a burstiness curve of a traffic source containing digital data, comprising:

feeding an actual or simulated first traffic source into a peak-rate shaper and producing a new time sequence for the bit-stream of the traffic source;

feeding said first traffic source from the output of the peak-rate shaper, m(r,t), into a server with deterministic rate $\rho$ in the range [0,r], where r is the peak rate of the shaper;

observing the dynamics of queue size $Q_p(r,t)$;

recording maximum queue length denoted by $\sigma(r,\rho)$ which corresponds to the burstiness of the traffic source for rate $\rho$; and computing the burstiness curve by analytically deriving the maximum queue length $\sigma(r,\rho)=\max_t(Q_p(r,t))$ for different values of rate $\rho$ of the given traffic source.

4. A method of computing a burstiness curve for a traffic source, comprising:

(a) feeding an actual or simulated first traffic source into a peak-rate shaper and producing a new time sequence for the bit-stream of the traffic source;

(b) feeding said first traffic source from the output of the peak-rate shaper m(r,t), into a server with deterministic rate $\rho$ in the range [0,r] where r is the peak rate of the shaper;

(c) setting current rate $\rho$ to zero;

(d) computing busy periods for current rate $\rho$ and corresponding maximum queue size $Q^*$;

(e) determining a new rate $\rho'$ for the next iteration;

(f) outputting a corresponding point $(\rho,Q^*)$ along the burstiness curve if slope of burstiness curve has changed;

(g) substituting rate $\rho'$, for the current rate $\rho$ and returning to step (d) if rate $\rho$ is not equal to the peak rate r; and (h) connecting the global maximum queue size at all $(\rho,Q^*)$ points that have been output to form a burstiness curve for said traffic source.

5. A method as recited in claim 4, wherein said slope change for an exact burstiness computation is determined selective of the group of characterization events consisting of:

movement of maximum queue size to a different time instant within the same busy period;

movement of maximum queue size to a different busy period;

a change in the number of busy periods; and a change in the starting time of a given busy period.

6. A method as recited in claim 4, wherein said slope change for an approximate burstiness computation is determined selective of the group of characterization events consisting of:

a break in the busy period where the current maximum queue size is located;

movement of maximum queue size to a different time instant within the same busy period;

movement of maximum queue size to a different busy period;

a change in the number of busy periods; and a change in the starting time of a given busy period.

* * * * *